(12) United States Patent
Abedini et al.

(10) Patent No.: US 11,743,710 B2
(45) Date of Patent: Aug. 29, 2023

(54) MOBILITY HISTORY REPORTING IN NEW RADIO

(71) Applicant: QUALCOMM Incorporated, San Diego, CA (US)

(72) Inventors: Navid Abedini, Basking Ridge, NJ (US); Ozcan Ozturk, San Diego, CA (US); Gavin Bernard Horn, La Jolla, CA (US); Tao Luo, San Diego, CA (US); Junyi Li, Franklin Park, NJ (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/211,609

(22) Filed: Mar. 24, 2021

(65) Prior Publication Data
US 2021/0306838 A1    Sep. 30, 2021

Related U.S. Application Data

(60) Provisional application No. 63/000,196, filed on Mar. 26, 2020, provisional application No. 63/022,907, filed on May 11, 2020.

(51) Int. Cl.
*H04W 8/02* (2009.01)
*H04W 8/18* (2009.01)
(Continued)

(52) U.S. Cl.
CPC .............. *H04W 8/02* (2013.01); *H04W 4/029* (2018.02); *H04W 8/18* (2013.01); *H04W 48/16* (2013.01)

(58) Field of Classification Search
CPC ....... H04W 24/02; H04W 24/10; H04W 4/02; H04W 64/00; H04W 84/00; H04W 8/08;
(Continued)

(56) References Cited

U.S. PATENT DOCUMENTS

| 2004/0224716 A1* | 11/2004 | Choi .............................. 455/522 |
| 2015/0111581 A1* | 4/2015 | Yiu et al. .......... H04W 36/0061 |

(Continued)

FOREIGN PATENT DOCUMENTS

| CN | 107295546 A | * 10/2017 | ............. H04W 24/04 |
| CN | 105580403 A | * 5/2018 | .............. H04W 8/08 |

(Continued)

OTHER PUBLICATIONS

Method for Determining Tracking Area, Terminal Apparatus, and Core Network Apparatus; WO 2020164549 A1 (Year: 2020).*

(Continued)

*Primary Examiner* — Meless N Zewdu
(74) *Attorney, Agent, or Firm* — Harrity & Harrity, LLP

(57) ABSTRACT

Various aspects of the present disclosure generally relate to wireless communication. In some aspects, a wireless node may receive a mobility history reporting configuration for providing mobility history information associated with a visited cell; and transmit, to a parent node of the wireless node, a mobility history report, containing the mobility history information, based at least in part on the mobility history reporting configuration. Numerous other aspects are provided.

30 Claims, 13 Drawing Sheets

(51) Int. Cl.
*H04W 48/16* (2009.01)
*H04W 4/029* (2018.01)

(58) Field of Classification Search
CPC ....... H04W 8/18; H04W 4/029; H04W 4/005; H04W 48/16; H04W 88/00; H04W 88/005; H04W 88/02; H04W 88/08; H04W 88/18; H04W 4/021; H04W 8/02; H04W 68/04; H04W 8/16; H04W 24/04; H04W 84/005; H04W 8/26; H04W 48/04; H04W 8/082; H04W 36/0083; H04W 36/00835; H04W 36/04; H04W 36/0061
See application file for complete search history.

(56) References Cited

U.S. PATENT DOCUMENTS

| | | | |
|---|---|---|---|
| 2015/0163639 A1* | 6/2015 | Kilpatrick, II et al. | H04W 4/028 |
| 2016/0217377 A1* | 7/2016 | Senarath et al. | G06N 5/04 |
| 2016/0227464 A1* | 8/2016 | Senarath et al. | H04W 40/02 |
| 2017/0055186 A1 | 2/2017 | Donepudi et al. | |
| 2017/0142547 A1 | 5/2017 | Hou et al. | |
| 2017/0208494 A1* | 7/2017 | Moon et al. | H04W 24/10 |
| 2017/0339594 A1 | 11/2017 | Park et al. | |
| 2019/0075613 A1* | 3/2019 | Teyeb et al. | H04W 76/36 |
| 2019/0254105 A1* | 8/2019 | Kim et al. | H04W 76/27 |
| 2019/0373442 A1* | 12/2019 | Kim | H04W 8/08 |
| 2020/0367189 A1* | 11/2020 | Lee et al. | H04W 60/00 |
| 2021/0044958 A1* | 2/2021 | Abedini et al. | H04W 8/08 |
| 2021/0044959 A1* | 2/2021 | Beaurepaire et al. | H04W 8/16 |
| 2021/0067945 A1* | 3/2021 | Liu et al. | H04W 8/08 |
| 2021/0105605 A1* | 4/2021 | Tsuboi et al. | H04W 8/08 |
| 2021/0176686 A1* | 6/2021 | Khalid | H04W 36/22 |
| 2021/0274391 A1* | 9/2021 | Khlass et al. | H04W 36/0033 |
| 2022/0167215 A1* | 5/2022 | Hu et al. | H04W 36/0016 |

FOREIGN PATENT DOCUMENTS

| | | | | |
|---|---|---|---|---|
| EP | 2814279 A1 | | 12/2014 | |
| EP | 2869647 A1 | * | 5/2015 | ............ H04W 24/10 |
| KR | WO 2018155918 A1 | * | 8/2018 | ............ H04B 7/063 |
| WO | WO-03105501 A1 | | 12/2003 | |
| WO | WO 2013147499 A1 | * | 10/2013 | ............ H04W 36/32 |
| WO | WO 2015060987 A1 | * | 4/2015 | ............ G08B 25/016 |
| WO | WO 2015063371 A1 | * | 5/2015 | ............ H04W 36/245 |
| WO | WO 2018155918 A1 | * | 8/2018 | ............ H04B 7/063 |

OTHER PUBLICATIONS

Providing Mobility State Data From User Equipment To Network Control Node; EP 2696644 A1 (Year: 2014).*
Method for Reporting Mobility History of Terminal and Apparatus for Supporting Same; WO 2018155918 A1 (Year: 2018).*
International Search Report and Written Opinion—PCT/US2021/024170—ISA/EPO—dated Jul. 5, 2021.

* cited by examiner

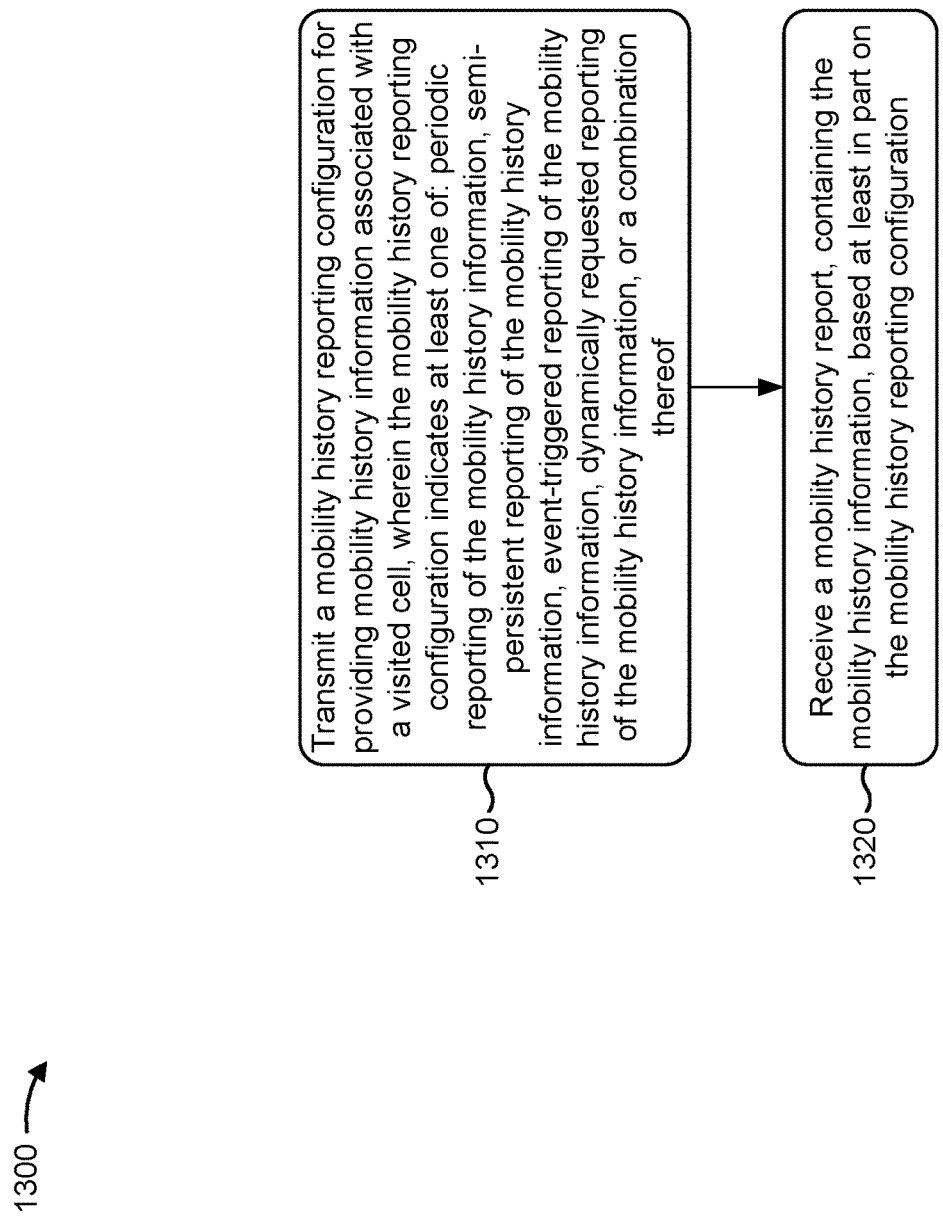

MOBILITY HISTORY REPORTING IN NEW RADIO

CROSS-REFERENCE TO RELATED APPLICATION

This patent application claims priority to U.S. Provisional Patent Application No. 63/000,196, filed on Mar. 26, 2020, entitled "MOBILITY HISTORY REPORTING IN NEW RADIO," and U.S. Provisional Patent Application No. 63/022,907, filed on May 11, 2020, entitled "MOBILITY HISTORY REPORTING IN NEW RADIO," each of which is assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for mobility history reporting in New Radio.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a wireless node for wireless communication includes a memory and one or more processors, coupled to the memory, configured to: receive a mobility history reporting configuration for providing mobility history information associated with a visited cell; and transmit, to a parent node of the wireless node, a mobility history report, containing the mobility history information, based at least in part on the mobility history reporting configuration, wherein the mobility history information comprises at least one of a pair of cell identities, including a global cell identity (ID) corresponding to the visited cell and a physical cell ID corresponding to the visited cell, or a set of mobility parameters, wherein the set of mobility parameters indicate at least one of: an entry time corresponding to a time at which the wireless node entered the visited cell, an exit time corresponding to a time at which the wireless node exited the visited cell, or a combination thereof.

In some aspects, a wireless node for wireless communication includes a memory and one or more processors, coupled to the memory, configured to: receive, from a child node of the wireless node, a mobility history report, containing mobility history information associated with a visited cell, wherein the mobility history information comprises at least one of a pair of cell identities, including a global cell ID corresponding to the visited cell and a physical cell ID corresponding to the visited cell, or a set of mobility parameters, wherein the set of mobility parameters indicate at least one of: an entry time corresponding to a time at which the child node entered the visited cell, an exit time corresponding to a time at which the child node exited the visited cell, or a combination thereof; and perform an action based at least in part on the mobility history information.

In some aspects, a method of wireless communication, performed by a wireless node, may include receiving a mobility history reporting configuration for providing mobility history information associated with a visited cell; and transmitting, to a parent node of the wireless node, a mobility history report, containing the mobility history information, based at least in part on the mobility history reporting configuration, wherein the mobility history information comprises a set of mobility parameters, wherein the set of mobility parameters indicate at least one of: an entry time corresponding to a time at which the wireless node entered the visited cell, an exit time corresponding to a time at which the wireless node exited the visited cell, or a combination thereof.

In some aspects, a method of wireless communication, performed by a wireless node, may include receiving, from a child node of the wireless node, a mobility history report, containing mobility history information associated with a visited cell, wherein the mobility history information comprises a set of mobility parameters, wherein the set of mobility parameters indicate at least one of: an entry time corresponding to a time at which the child node entered the visited cell, an exit time corresponding to a time at which the child node exited the visited cell, or a combination thereof; and performing an action based at least in part on the mobility history information.

In some aspects, a method of wireless communication, performed by a wireless node, may include receiving a mobility history reporting configuration for providing mobility history information associated with a visited cell; and transmitting, to a parent node of the wireless node, a mobility history report, containing the mobility history information, based at least in part on the mobility history reporting configuration, wherein the mobility history information comprises tracking information associated with the visited cell.

In some aspects, a method of wireless communication, performed by a wireless node, may include receiving, from a child node of the wireless node, a mobility history report, containing mobility history information associated with a visited cell, wherein the mobility history information comprises tracking information associated with the visited cell; and performing an action based at least in part on the mobility history information.

In some aspects, a method of wireless communication, performed by a wireless node, may include receiving a mobility history reporting configuration for providing mobility history information associated with a visited cell; and transmitting, to a parent node of the wireless node, a mobility history report, containing the mobility history information, based at least in part on the mobility history reporting configuration, wherein the mobility history information comprises: a global cell identity (ID) corresponding to the visited cell, and a physical cell ID corresponding to the visited cell.

In some aspects, a method of wireless communication, performed by a wireless node, may include receiving, from a child node of the wireless node, a mobility history report, containing mobility history information associated with a visited cell, wherein the mobility history information comprises: a global cell ID corresponding to the visited cell, and a physical cell ID corresponding to the visited cell; and performing an action based at least in part on the mobility history information.

In some aspects, a method of wireless communication, performed by a wireless node, may include receiving a mobility history reporting configuration for providing mobility history information associated with a visited cell, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof, and transmitting, to a parent node of the wireless node, a mobility history report, containing the mobility history information, based at least in part on the mobility history reporting configuration.

In some aspects, a method of wireless communication, performed by a wireless node, may include transmitting, to a child node of the wireless node, a mobility history reporting configuration for providing mobility history information associated with a visited cell, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof; and receiving, from the child node of the wireless node, a mobility history report, containing the mobility history information, based at least in part on the mobility history reporting configuration.

In some aspects, a wireless node for wireless communication may include a memory and one or more processors coupled to the memory. The memory and the one or more processors may be configured to receive a mobility history reporting configuration for providing mobility history information associated with a visited cell; and transmit, to a parent node of the wireless node, a mobility history report, containing the mobility history information, based at least in part on the mobility history reporting configuration, wherein the mobility history information comprises a set of mobility parameters, wherein the set of mobility parameters indicate at least one of: an entry time corresponding to a time at which the wireless node entered the visited cell, an exit time corresponding to a time at which the wireless node exited the visited cell, or a combination thereof.

In some aspects, a wireless node for wireless communication may include a memory and one or more processors coupled to the memory. The memory and the one or more processors may be configured to receive, from a child node of the wireless node, a mobility history report, containing mobility history information associated with a visited cell, wherein the mobility history information comprises a set of mobility parameters, wherein the set of mobility parameters indicate at least one of: an entry time corresponding to a time at which the child node entered the visited cell, an exit time corresponding to a time at which the child node exited the visited cell, or a combination thereof; and perform an action based at least in part on the mobility history information.

In some aspects, a wireless node for wireless communication may include a memory and one or more processors coupled to the memory. The memory and the one or more processors may be configured to receive a mobility history reporting configuration for providing mobility history information associated with a visited cell; and transmit, to a parent node of the wireless node, a mobility history report, containing the mobility history information, based at least in part on the mobility history reporting configuration, wherein the mobility history information comprises tracking information associated with the visited cell.

In some aspects, a wireless node for wireless communication may include a memory and one or more processors coupled to the memory. The memory and the one or more processors may be configured to receive, from a child node of the wireless node, a mobility history report, containing mobility history information associated with a visited cell, wherein the mobility history information comprises tracking information associated with the visited cell; and perform an action based at least in part on the mobility history information.

In some aspects, a wireless node for wireless communication may include a memory and one or more processors coupled to the memory. The memory and the one or more processors may be configured to receive a mobility history reporting configuration for providing mobility history information associated with a visited cell; and transmit, to a parent node of the wireless node, a mobility history report, containing the mobility history information, based at least in part on the mobility history reporting configuration, wherein the mobility history information comprises: a global cell ID corresponding to the visited cell, and a physical cell ID corresponding to the visited cell.

In some aspects, a wireless node for wireless communication may include a memory and one or more processors coupled to the memory. The memory and the one or more processors may be configured to receive, from a child node of the wireless node, a mobility history report, containing mobility history information associated with a visited cell, wherein the mobility history information comprises: a global cell ID corresponding to the visited cell, and a physical cell ID corresponding to the visited cell; and perform an action based at least in part on the mobility history information.

In some aspects, a wireless node for wireless communication may include a memory and one or more processors coupled to the memory. The memory and the one or more processors may be configured to receive a mobility history reporting configuration for providing mobility history information associated with a visited cell, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof; and transmit, to a parent node of the wireless node, a mobility history report, containing the mobility history information, based at least in part on the mobility history reporting configuration.

In some aspects, a wireless node for wireless communication may include a memory and one or more processors coupled to the memory. The memory and the one or more processors may be configured to transmit, to a child node of the wireless node, a mobility history reporting configuration for providing mobility history information associated with a visited cell, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof; and receive, from the child node of the wireless node, a mobility history report, containing the mobility history information, based at least in part on the mobility history reporting configuration.

In some aspects, a non-transitory computer-readable medium may store one or more instructions for wireless communication. The one or more instructions, when executed by one or more processors of a wireless node, may cause the one or more processors to receive a mobility history reporting configuration for providing mobility history information associated with a visited cell; and transmit, to a parent node of the wireless node, a mobility history report, containing the mobility history information, based at least in part on the mobility history reporting configuration, wherein the mobility history information comprises a set of mobility parameters, wherein the set of mobility parameters indicate at least one of: an entry time corresponding to a time at which the wireless node entered the visited cell, an exit time corresponding to a time at which the wireless node exited the visited cell, or a combination thereof.

In some aspects, a non-transitory computer-readable medium may store one or more instructions for wireless communication. The one or more instructions, when executed by one or more processors of a wireless node, may cause the one or more processors to receive, from a child node of the wireless node, a mobility history report, containing mobility history information associated with a visited cell, wherein the mobility history information comprises a set of mobility parameters, wherein the set of mobility parameters indicate at least one of: an entry time corresponding to a time at which the child node entered the visited cell, an exit time corresponding to a time at which the child node exited the visited cell, or a combination thereof; and perform an action based at least in part on the mobility history information.

In some aspects, a non-transitory computer-readable medium may store one or more instructions for wireless communication. The one or more instructions, when executed by one or more processors of a wireless node, may cause the one or more processors to receive a mobility history reporting configuration for providing mobility history information associated with a visited cell; and transmit, to a parent node of the wireless node, a mobility history report, containing the mobility history information, based at least in part on the mobility history reporting configuration, wherein the mobility history information comprises tracking information associated with the visited cell.

In some aspects, a non-transitory computer-readable medium may store one or more instructions for wireless communication. The one or more instructions, when executed by one or more processors of a wireless node, may cause the one or more processors to receive, from a child node of the wireless node, a mobility history report, containing mobility history information associated with a visited cell, wherein the mobility history information comprises tracking information associated with the visited cell; and perform an action based at least in part on the mobility history information.

In some aspects, a non-transitory computer-readable medium may store one or more instructions for wireless communication. The one or more instructions, when executed by one or more processors of a wireless node, may cause the one or more processors to receive a mobility history reporting configuration for providing mobility history information associated with a visited cell; and transmit, to a parent node of the wireless node, a mobility history report, containing the mobility history information, based at least in part on the mobility history reporting configuration, wherein the mobility history information comprises: a global cell ID corresponding to the visited cell, and a physical cell ID corresponding to the visited cell.

In some aspects, a non-transitory computer-readable medium may store one or more instructions for wireless communication. The one or more instructions, when executed by one or more processors of a wireless node, may cause the one or more processors to receive, from a child node of the wireless node, a mobility history report, containing mobility history information associated with a visited cell, wherein the mobility history information comprises: a global cell ID corresponding to the visited cell, and a physical cell ID corresponding to the visited cell; and perform an action based at least in part on the mobility history information.

In some aspects, a non-transitory computer-readable medium may store one or more instructions for wireless communication. The one or more instructions, when executed by one or more processors of a wireless node, may cause the one or more processors to receive a mobility history reporting configuration for providing mobility history information associated with a visited cell, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof; and transmit, to a parent node of the wireless node, a mobility history report, containing the mobility history information, based at least in part on the mobility history reporting configuration.

In some aspects, a non-transitory computer-readable medium may store one or more instructions for wireless communication. The one or more instructions, when executed by one or more processors of a wireless node, may cause the one or more processors to transmit, to a child node of the wireless node, a mobility history reporting configuration for providing mobility history information associated with a visited cell, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof; and receive, from the child node of the wireless node, a mobility history report, containing the mobility history information, based at least in part on the mobility history reporting configuration.

In some aspects, an apparatus for wireless communication may include means for receiving a mobility history reporting configuration for providing mobility history information associated with a visited cell; and means for transmitting, to a parent node of the apparatus, a mobility history report, containing the mobility history information, based at least in part on the mobility history reporting configuration, wherein the mobility history information comprises a set of mobility parameters, wherein the set of mobility parameters indicate at least one of: an entry time corresponding to a time at which the apparatus entered the visited cell, an exit time corresponding to a time at which the apparatus exited the visited cell, or a combination thereof.

In some aspects, an apparatus for wireless communication may include means for receiving, from a child node of the apparatus, a mobility history report, containing mobility history information associated with a visited cell, wherein the mobility history information comprises a set of mobility parameters, wherein the set of mobility parameters indicate at least one of: an entry time corresponding to a time at which the child node entered the visited cell, an exit time corresponding to a time at which the child node exited the visited cell, or a combination thereof; and means for performing an action based at least in part on the mobility history information.

In some aspects, an apparatus for wireless communication may include means for receiving a mobility history reporting configuration for providing mobility history information associated with a visited cell; and means for transmitting, to a parent node of the apparatus, a mobility history report, containing the mobility history information, based at least in part on the mobility history reporting configuration, wherein the mobility history information comprises tracking information associated with the visited cell.

In some aspects, an apparatus for wireless communication may include means for receiving, from a child node of the apparatus, a mobility history report, containing mobility history information associated with a visited cell, wherein the mobility history information comprises tracking information associated with the visited cell; and means for performing an action based at least in part on the mobility history information.

In some aspects, an apparatus for wireless communication may include means for receiving a mobility history reporting configuration for providing mobility history information associated with a visited cell; and means for transmitting, to a parent node of the apparatus, a mobility history report, containing the mobility history information, based at least in part on the mobility history reporting configuration, wherein the mobility history information comprises: a global cell ID corresponding to the visited cell, and a physical cell ID corresponding to the visited cell.

In some aspects, an apparatus for wireless communication may include means for receiving, from a child node of the apparatus, a mobility history report, containing mobility history information associated with a visited cell, wherein the mobility history information comprises: a global cell ID corresponding to the visited cell, and a physical cell ID corresponding to the visited cell; and means for performing an action based at least in part on the mobility history information.

In some aspects, an apparatus for wireless communication may include means for receiving a mobility history reporting configuration for providing mobility history information associated with a visited cell, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof, and means for transmitting, to a parent node of the apparatus, a mobility history report, containing the mobility history information, based at least in part on the mobility history reporting configuration.

In some aspects, an apparatus for wireless communication may include means for transmitting, to a child node of the apparatus, a mobility history reporting configuration for providing mobility history information associated with a visited cell, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof; and means for receiving, from the child node of the apparatus, a mobility history report, containing the mobility history information, based at least in part on the mobility history reporting configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-13 are diagrams illustrating example processes performed, for example, by wireless nodes, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
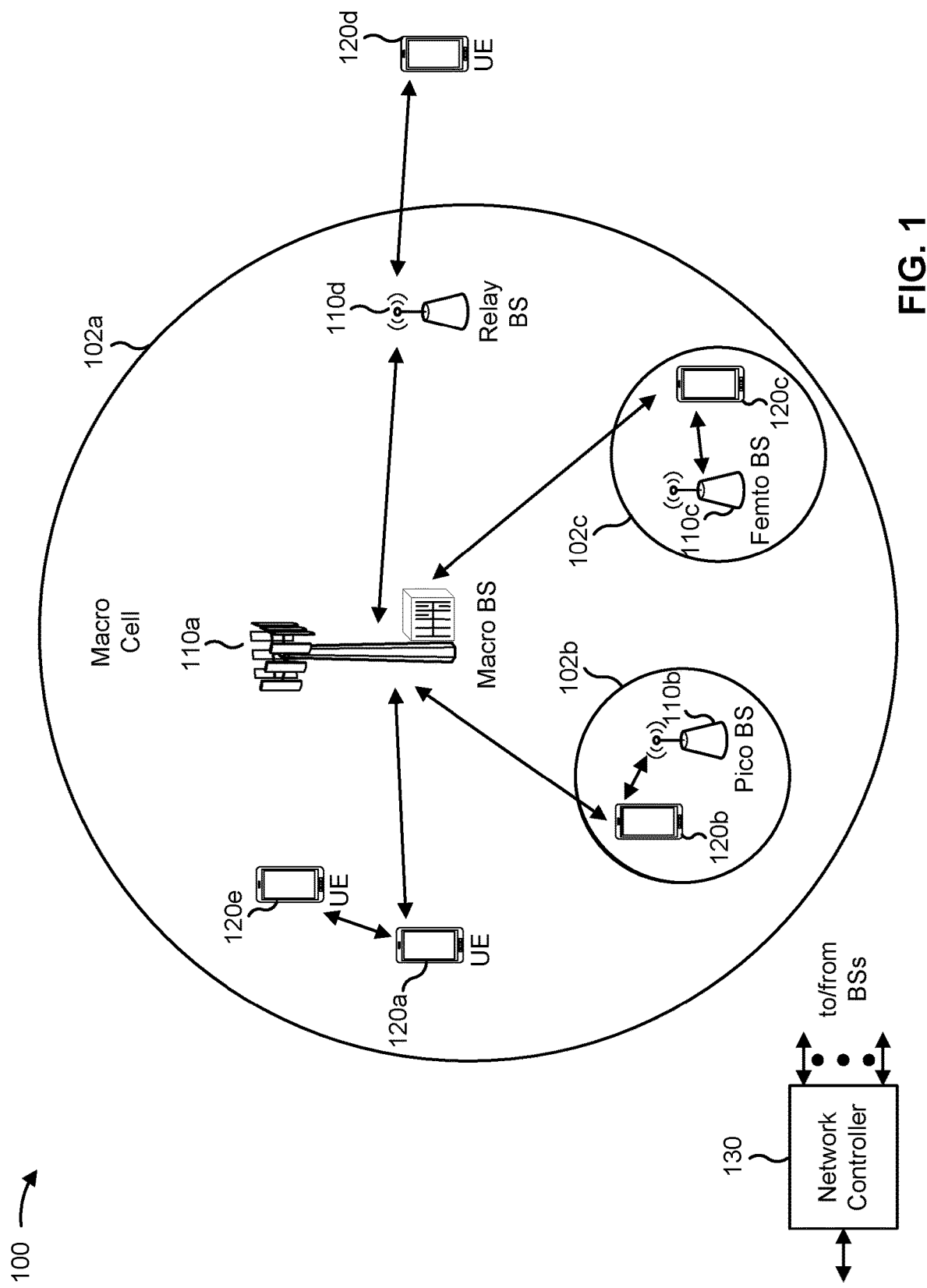
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
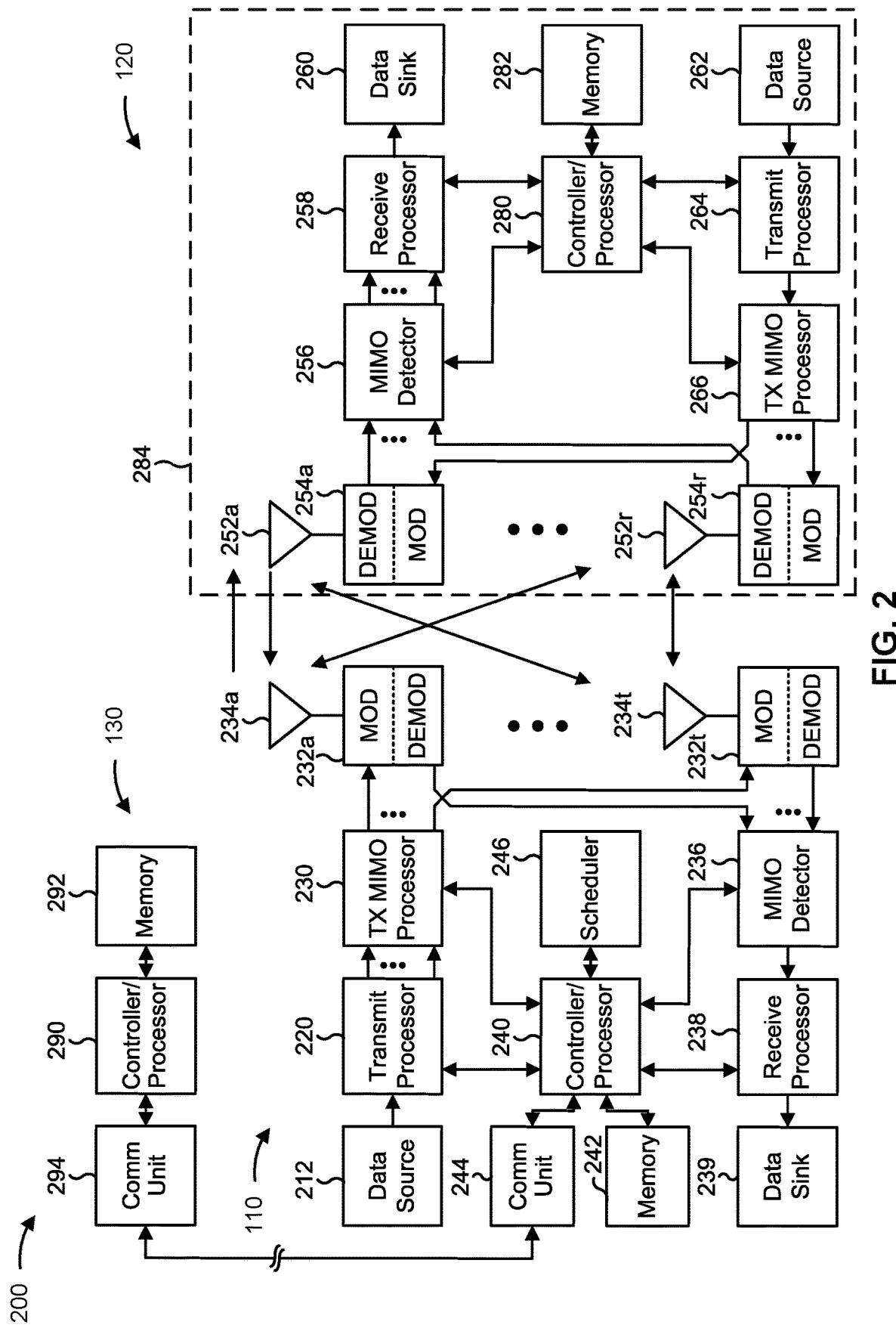
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-13).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-13).

Controller/processor 240 of base station 110, controller/processor 280 of UE 120, and/or any other component(s) of FIG. 2 may perform one or more techniques associated with mobility history reporting in NR, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, process 1000 of FIG. 10, process 1100 of FIG. 11, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, a wireless node may include means for receiving a mobility history reporting configuration for providing mobility history information associated with a visited cell, means for transmitting, to a parent node of the wireless node, a mobility history report, containing the mobility history information, based at least in part on the mobility history reporting configuration, wherein the mobility history information comprises a set of mobility parameters, wherein the set of mobility parameters indicate at least one of: an entry time corresponding to a time at which the wireless node entered the visited cell, an exit time corresponding to a time at which the wireless node exited the visited cell, or a combination thereof, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a wireless node may include means for receiving, from a child node of the wireless node, a mobility history report, containing mobility history information associated with a visited cell, wherein the mobility history information comprises a set of mobility parameters, wherein the set of mobility parameters indicate at least one of: an entry time corresponding to a time at which the child node entered the visited cell, an exit time corresponding to a time at which the child node exited the visited cell, or a combination thereof, means for performing an action based at least in part on the mobility history information, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a wireless node may include means for receiving a mobility history reporting configuration for providing mobility history information associated with a visited cell, means for transmitting, to a parent node of the wireless node, a mobility history report, containing the mobility history information, based at least in part on the mobility history reporting configuration, wherein the mobility history information comprises tracking information associated with the visited cell, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a wireless node may include means for receiving, from a child node of the wireless node, a mobility history report, containing mobility history information associated with a visited cell, wherein the mobility history information comprises tracking information associated with the visited cell, means for performing an action based at least in part on the mobility history information, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a wireless node may include means for receiving a mobility history reporting configuration for providing mobility history information associated with a visited cell, means for transmitting, to a parent node of the wireless node, a mobility history report, containing the mobility history information, based at least in part on the mobility history reporting configuration, wherein the mobility history information comprises: a global cell identity (ID) corresponding to the visited cell, and a physical cell ID corresponding to the visited cell, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a wireless node may include means for receiving, from a child node of the wireless node, a mobility history report, containing mobility history information associated with a visited cell, wherein the mobility history information comprises: a global cell identity (ID) corresponding to the visited cell, and a physical cell ID corresponding to the visited cell, means for performing an action based at least in part on the mobility history information, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a wireless node may include means for receiving a mobility history reporting configuration for providing mobility history information associated with a visited cell, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof, means for transmitting, to a parent node of the wireless node, a mobility history report, containing the mobility history information, based at least in part on the mobility history reporting configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a wireless node may include means for transmitting, to a child node of the wireless node, a mobility history reporting configuration for providing mobility history information associated with a visited cell, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof, means for receiving, from the child node of the wireless node, a mobility history report, containing the mobility history information, based at least in part on the mobility history reporting configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
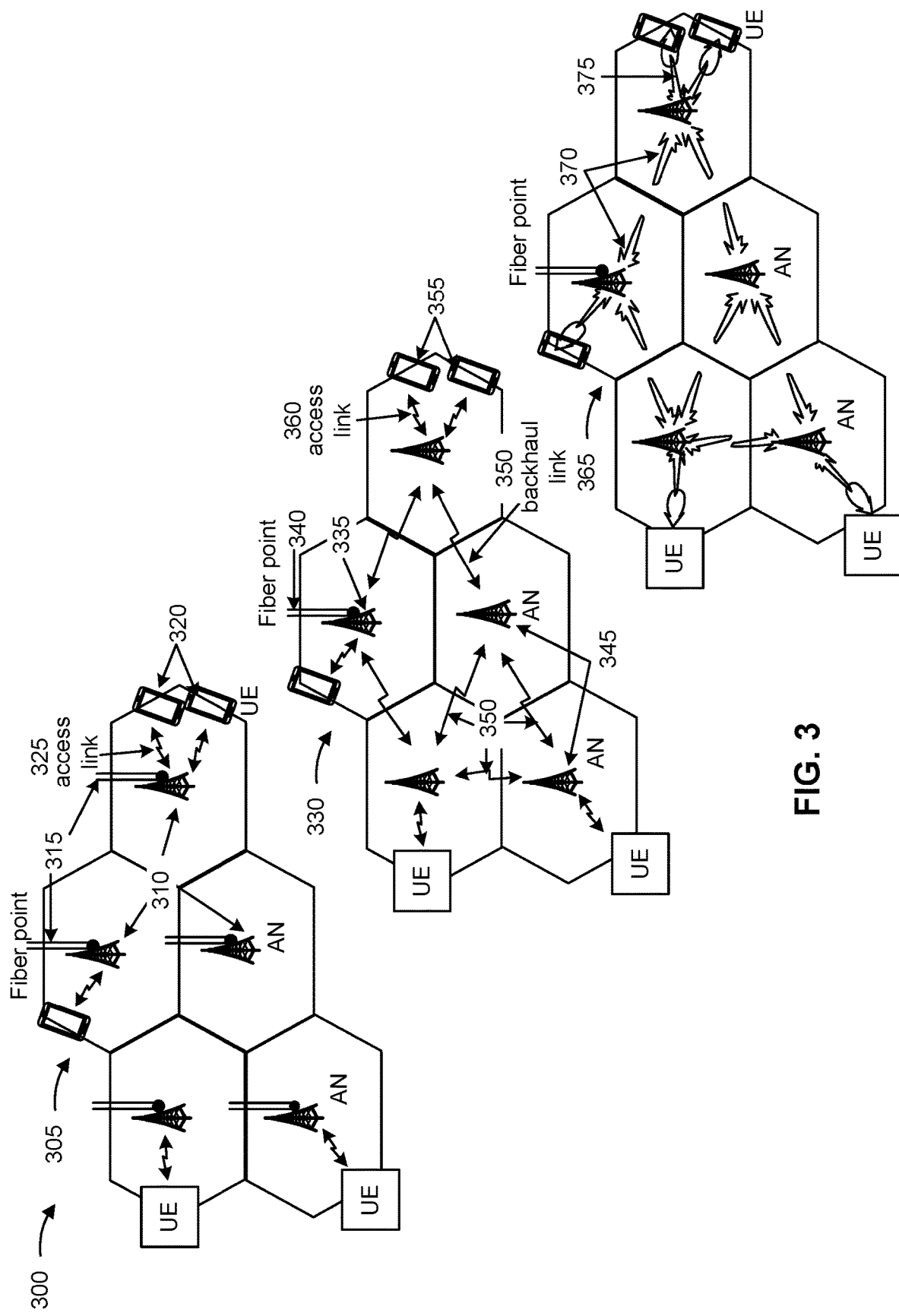
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
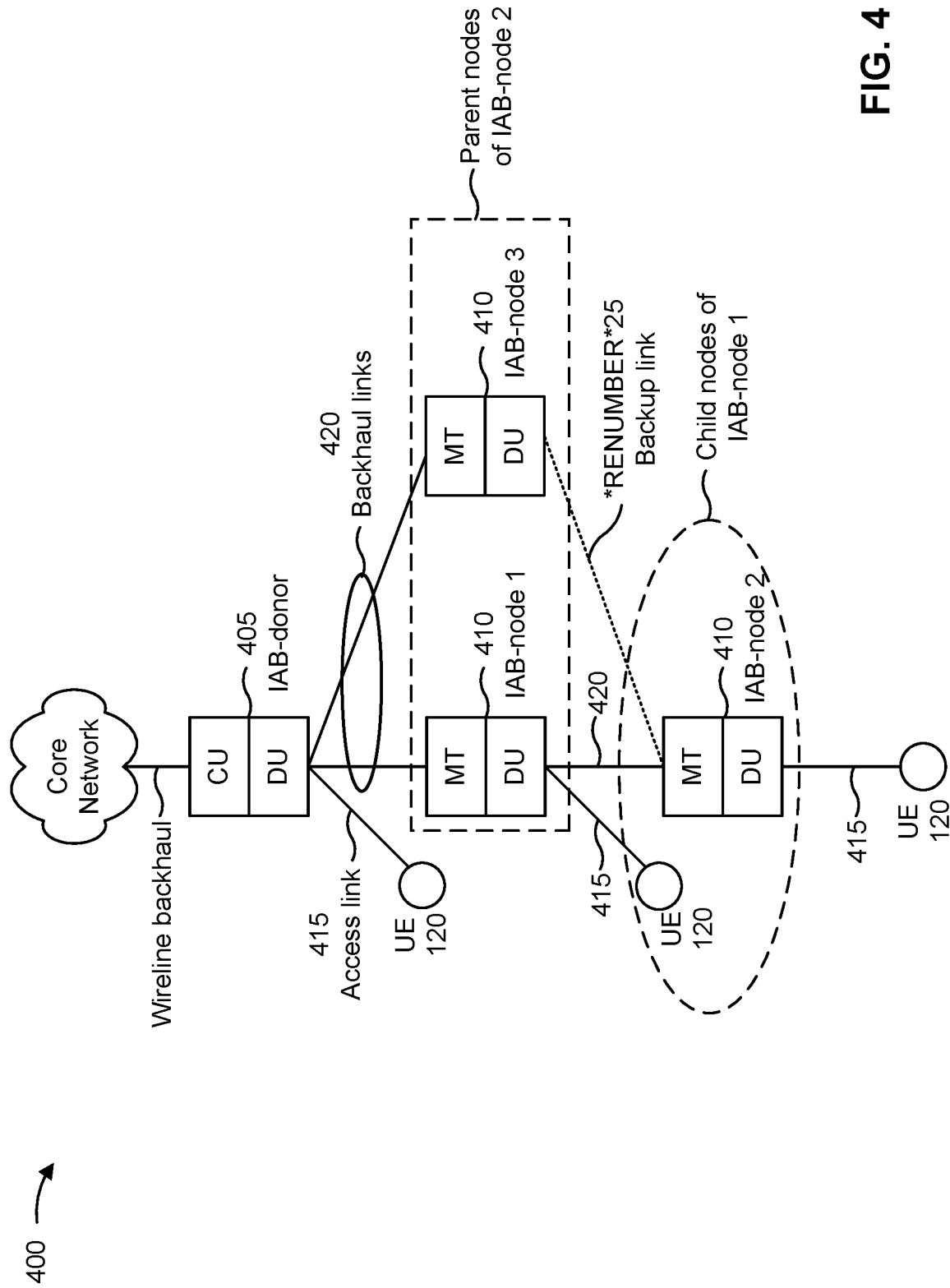
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with 3. As shown, an IAB donor 405 may include a central unit (CU), which may perform access node controller (ANC) functions and/or AMF functions. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

spatial resources, and/or the like) may be shared between a parent link 425 of an IAB node 410 (shown as link 420/425 for IAB-node 1) and a child link 430 of the IAB node 410 (shown as link 420/430 for IAB-node 1). When an IAB node 410 uses time division multiplexing (TDM) between a parent link 425 and a child link 430, the IAB node 410 is subject to a half duplex constraint, meaning that the IAB node 410 cannot transmit and receive information at the same time (e.g., cannot concurrently communicate via a parent link 425 of the IAB node 410 and a child link 430 of the IAB node 410). This constraint may lead to high latency for communications.

To reduce latency, increase robustness, and expand coverage of an IAB network, the IAB network may be over-deployed. For example, there may be multiple IAB donors 405 and/or IAB nodes 410 with overlapping coverage, there may be multiple routes from a particular UE 120 and/or IAB node 410 to another IAB node and/or to the IAB donor 405, and/or the like. For example, because millimeter wave communications have high signal attenuation during propagation, IAB nodes 410 with overlapping coverage may be deployed to expand coverage in the IAB network and mitigate such signal attenuation. Furthermore, because millimeter wave communications are susceptible to link blockage and link failure, IAB nodes 410 with overlapping coverage may be deployed to improve robustness of the IAB network.

In some cases, to improve reliability of transmissions in an IAB network, packets may be transmitted to a destination (e.g., an IAB node, an IAB donor, a UE, and/or the like) along multiple paths. For example, packet data convergence protocol (PDCP) duplication may be employed at the CU and/or the UE to improve reliability. However, PDCP duplication results in large overhead. Some techniques and apparatuses described herein enable network coding to be used in an IAB network. Network coding improves reliability while using less resource overhead than PDCP duplication.

As indicated above, FIG. 4 is provided as an example. Other examples may differ from what is described with regard to FIG. 4.

In LTE, a UE, if capable, may keep track of the cells that the UE has camped on while in idle and/or connected mode. This sort of mobility history information may be reported to the network, which may use the information to better estimate the mobility state of the UE and adjust the UE's parameters accordingly. The network may leverage the submitted information for more efficient network planning and management, as well. NR has also been developed to include a similar procedure for a UE to submit mobility history information.

In NR, and as part of mobile IAB, NR networks may have cells that are mobile—cells that may be moving. It has been recognized that having a reliable estimation of relative mobility state between a UE and a cell may be useful for optimizing various signaling and procedures. For example, it has been proposed that available mobility information and measurements may be used to classify different UEs based on their relative mobility to a given cell. This classification may be used, for example, to prioritize service and resource management to one group versus another, to set various parameters optimally for operation of different groups, and/or the like.

In some aspects of the techniques and apparatuses described herein, a wireless node (e.g., a UE, a child node, a parent node, and/or the like) may transmit a mobility history report to a parent node (e.g., a wireless node, a base station, a mobile base station, and/or the like). The mobility history report may include mobility history information that may be used by the network for management of mobile cells and corresponding resources. In some aspects, the mobility history information may include an entry time corresponding to a time at which the wireless node entered a visited cell, an exit time corresponding to a time at which the wireless node exited the visited cell, a duration of time for which the wireless node visited the cell, and/or the like. In this way, aspects of the techniques described herein may facilitate tracking of patterns of activity of the wireless node, which may facilitate more efficient management of resources allocated to the wireless node.

In some aspects, the mobility history information may include a global cell identity (ID) corresponding to a visited cell and a physical cell ID corresponding to the visited cell. In this way, information about a particular cell's movements may be tracked as the cell moves, thereby changing its physical cell ID. In some aspects, the collection and/or reporting of mobility history information associated with a cell may be conditioned upon the type of wireless node that provides the cell, whether the cell is mobile, and/or the like. In this way, aspects of the techniques described herein may be efficiently managed, facilitating a reduction in signaling overhead, traffic, and/or the like.

Figure 5:
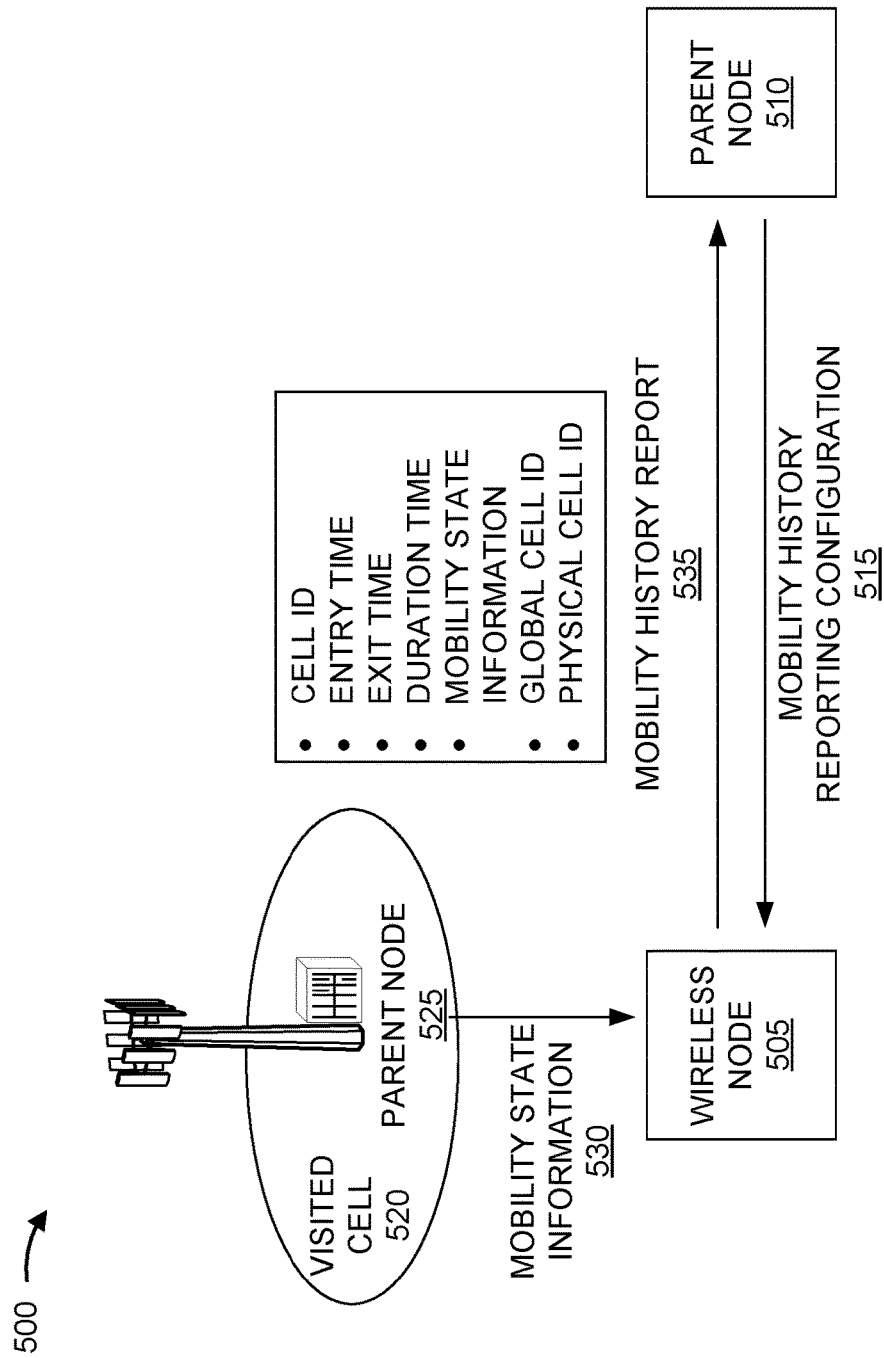
FIG. 5 is a diagram illustrating an example of mobility history reporting in New Radio, in accordance with the present disclosure.

FIG. 5 is a diagram illustrating an example 500 of mobility history reporting in NR, in accordance with the present disclosure. As shown, a wireless node 505 and a parent node 510 may communicate with one another.

In some aspects, the wireless node may be a child node of the parent node 510. In some aspects, the wireless node 505 may include a UE, a DU of an IAB node, an MT component of an IAB node, and/or the like. In some aspects, the parent node 510 may include a DU of an IAB node, an MT component of an IAB node, and/or the like.

As shown by reference number 515, the parent node 510 may transmit, and the wireless node 505 may receive, a mobility history reporting configuration for providing mobility history information associated with a visited cell 520. In some aspects, the visited cell 520 may be provided by a parent node 525 of the wireless node 505. In some aspects, the parent node 525 that provides the visited cell 520 may include a DU of an IAB node, an MT component of an IAB node, and/or the like. In some aspects, the mobility history reporting configuration may indicate periodic reporting of the mobility history information, semi-persistent reporting of the mobility history information, event-triggered reporting of the mobility history information, dynamically requested reporting of the mobility history information, and/or the like.

As shown by reference number 530, the parent node 525 that provides the visited cell 520 may transmit, and the wireless node 505 may receive, mobility state information associated with the visited cell 520. The mobility state information may indicate, for example, whether the visited cell 520 was mobile while the wireless node 505 was visiting the visited cell 520.

As shown by reference number 535, the wireless node 505 may transmit, and the parent node 510 may receive, a mobility history report. The mobility history report may include mobility history information, based at least in part on the mobility history reporting configuration.

In some aspects, as indicated above, the mobility history reporting configuration may indicate event-triggered reporting of the mobility history information. In some aspects, the wireless node 505 may detect an occurrence of a trigger event and transmit the mobility history report based at least in part on detecting the occurrence of the trigger event. In some aspects, detecting the occurrence of the trigger event may include determining that the wireless node 505 visited a quantity of cells during a time period following a prior transmission of a mobility history report, where the quantity of cells satisfies a threshold. In some aspects, detecting the occurrence of the trigger event may include determining that the wireless node visited the visited cell for a duration of time that satisfies a threshold.

In some aspects, detecting the occurrence of the trigger event may include determining that the visited cell has a global cell ID that is the same as another cell, where a physical cell ID of the visited cell is different than a physical ID of the other cell. In some aspects, detecting the occurrence of the trigger event may include determining that the visited cell has a physical cell ID that is the same as another cell, where a global cell ID of the visited cell is different than a global cell ID of the other cell.

In some aspects, as shown in FIG. 5, the mobility history information may include a set of mobility parameters that indicate a cell ID associated with the visited cell 520, an entry time corresponding to a time at which the wireless node 505 entered the visited cell 520, an exit time corresponding to a time at which the wireless node 505 exited the visited cell 520, a duration of time for which the wireless node 505 was visiting the visited cell 520, and/or the like.

In some aspects, the mobility history information may include tracking information associated with the visited cell 520. The tracking information may include location information associated with the wireless node 505 while the wireless node 505 was visiting the visited cell 520. In some aspects, the wireless node 505 may determine that a camping threshold is satisfied, where the camping threshold corresponds to a duration of time that the wireless node 505 spends visiting the visited cell 520, and include, in the tracking information, the location information based at least in part on determining that the camping threshold is satisfied. In some aspects, the visited cell 520 may include at least one of IAB node, a mobile node, and/or the like. In some aspects, the tracking information may include the location information based at least in part on the visited cell 520 comprising at least one of an IAB node, a mobile node, and/or the like.

In some aspects, the mobility history information may include a global cell ID corresponding to the visited cell 520, and a physical cell ID corresponding to the visited cell 520. In some aspects, the visited cell 520 may include an IAB node, a mobile node, and/or the like. In some aspects, the mobility history information may include the global cell ID and the physical cell ID based at least in part on the visited cell 520 comprising an IAB node, a mobile node, and/or the like.

In some aspects of the techniques and apparatuses described above, a wireless node may transmit a motility history report to a parent node. The mobility history report may include mobility history information that may be used by the network for management of mobile cells and corresponding resources. Aspects of the techniques discussed herein may facilitate tracking of patterns of activity of the wireless node, which may facilitate more efficient management of resources allocated to the wireless node.

As indicated above, FIG. 5 is provided as an example. Other examples may differ from what is described with respect to FIG. 5.

Figure 6:
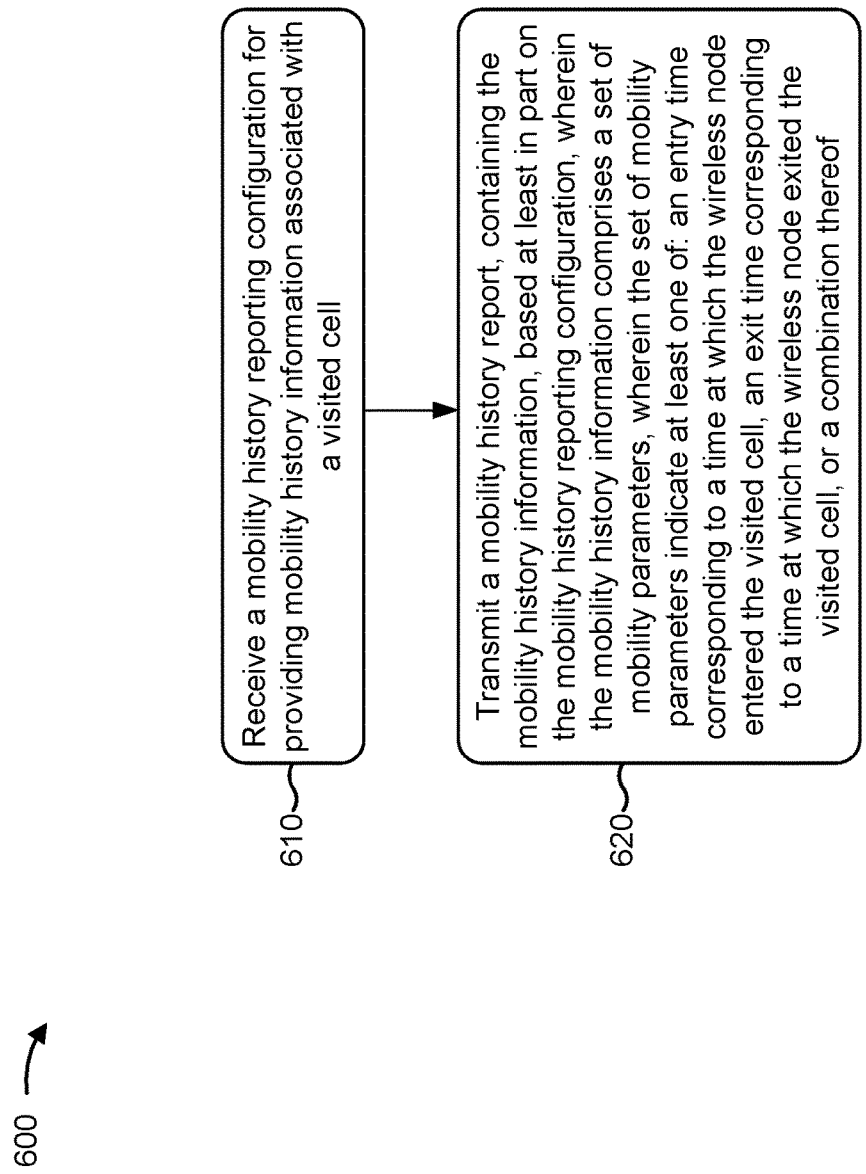

FIG. 6 is a diagram illustrating an example process 600 performed, for example, by a wireless node, in accordance with the present disclosure. Example process 600 is an example where the wireless node (e.g., wireless node 505, base station 110, UE 120, and/or the like) performs operations associated with mobility history reporting in New Radio.

As shown in FIG. 6, in some aspects, process 600 may include receiving a mobility history reporting configuration for providing mobility history information associated with a visited cell (block 610). For example, the wireless node (e.g., using receive processor 238, receive processor 258, controller/processor 240, controller/processor 280, memory 242, memory 282, and/or the like) may receive a mobility history reporting configuration for providing mobility history information associated with a visited cell, as described above.

As further shown in FIG. 6, in some aspects, process 600 may include transmitting, to a parent node of the wireless node, a mobility history report, containing the mobility history information, based at least in part on the mobility history reporting configuration, wherein the mobility history information comprises a set of mobility parameters, wherein the set of mobility parameters indicate at least one of: an entry time corresponding to a time at which the wireless node entered the visited cell, an exit time corresponding to a time at which the wireless node exited the visited cell, or a combination thereof (block 620). For example, the wireless node (e.g., using transmit processor 220, transmit processor 264, controller/processor 240, controller/processor 280, memory 242, memory 282, and/or the like) may transmit, to a parent node of the wireless node, a mobility history report, containing the mobility history information, based at least in part on the mobility history reporting configuration, as described above. In some aspects, the mobility history information comprises a set of mobility parameters. In some aspects, the set of mobility parameters indicate at least one of an entry time corresponding to a time at which the wireless node entered the visited cell, an exit time corresponding to a time at which the wireless node exited the visited cell, or a combination thereof.

Process 600 may include additional aspects, such as any single aspect or any combination of aspects described below and/or in connection with one or more other processes described elsewhere herein.

In a first aspect, the set of mobility parameters further indicate at least one of: a cell ID associated with the visited cell, a duration of time for which the wireless node was visiting the visited cell, or a combination thereof.

In a second aspect, alone or in combination with the first aspect, the mobility history information comprises tracking information associated with the visited cell.

In a third aspect, alone or in combination with one or more of the first and second aspects, the tracking information comprises mobility state information associated with the visited cell, the mobility state information at least indicates whether the visited cell was mobile while the wireless node was visiting the visited cell.

In a fourth aspect, alone or in combination with one or more of the first through third aspects, process 600 includes receiving, from a parent node that provides the visited cell, the mobility state information.

In a fifth aspect, alone or in combination with one or more of the first through fourth aspects, the tracking information comprises location information associated with the wireless node while the wireless node was visiting the visited cell.

In a sixth aspect, alone or in combination with one or more of the first through fifth aspects, process 600 includes determining that a camping threshold is satisfied, wherein the camping threshold corresponds to a duration of time that the wireless node spends visiting the visited cell, and wherein the tracking information comprises the location information is based at least in part on determining that the camping threshold is satisfied.

In a seventh aspect, alone or in combination with one or more of the first through sixth aspects, the visited cell comprises at least one of an IAB node, a mobile node, or a combination thereof, and the tracking information comprises the location information based at least in part on the visited cell comprising at least one of an IAB node, a mobile node, or a combination thereof.

In an eighth aspect, alone or in combination with one or more of the first through seventh aspects, the mobility history information comprises: a global cell ID corresponding to the visited cell, and a physical cell ID corresponding to the visited cell.

In a ninth aspect, alone or in combination with one or more of the first through eighth aspects, the visited cell comprises at least one of an IAB node, a mobile node, or a combination thereof, and the mobility history information comprises the global cell ID and the physical cell ID based at least in part on the visited cell comprising at least one of an IAB node, a mobile node, or a combination thereof.

In a tenth aspect, alone or in combination with one or more of the first through ninth aspects, the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof.

In an eleventh aspect, alone or in combination with one or more of the first through tenth aspects, the mobility history reporting configuration indicates event-triggered reporting of the mobility history information, and process 600 further comprises: detecting an occurrence of a trigger event, wherein the wireless node transmits the mobility history report based at least in part on detecting the occurrence of the trigger event.

In a twelfth aspect, alone or in combination with one or more of the first through eleventh aspects, detecting the occurrence of the trigger event comprises determining that the wireless node visited a quantity of cells during a time period following a prior transmission of a mobility history report, where the quantity of cells satisfies a threshold.

In a thirteenth aspect, alone or in combination with one or more of the first through twelfth aspects, detecting the occurrence of the trigger event comprises determining that the wireless node visited the visited cell for a duration of time that satisfies a threshold.

In a fourteenth aspect, alone or in combination with one or more of the first through thirteenth aspects, detecting the occurrence of the trigger event comprises determining that the visited cell has a global cell ID that is the same as another cell, where a physical cell ID of the visited cell is different than a physical ID of the other cell.

In a fifteenth aspect, alone or in combination with one or more of the first through fourteenth aspects, detecting the occurrence of the trigger event comprises determining that the visited cell has a physical cell ID that is the same as another cell, where a global cell ID of the visited cell is different than a global ID of the other cell.

In a sixteenth aspect, alone or in combination with one or more of the first through fifteenth aspects, the wireless node comprises a user equipment, a distributed unit of an IAB node, or a mobile termination component of an IAB node.

In a seventeenth aspect, alone or in combination with one or more of the first through sixteenth aspects, the visited cell is provided by a parent node of the wireless node, and the parent node comprises a distributed unit of an IAB node or a mobile termination component of an IAB node.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
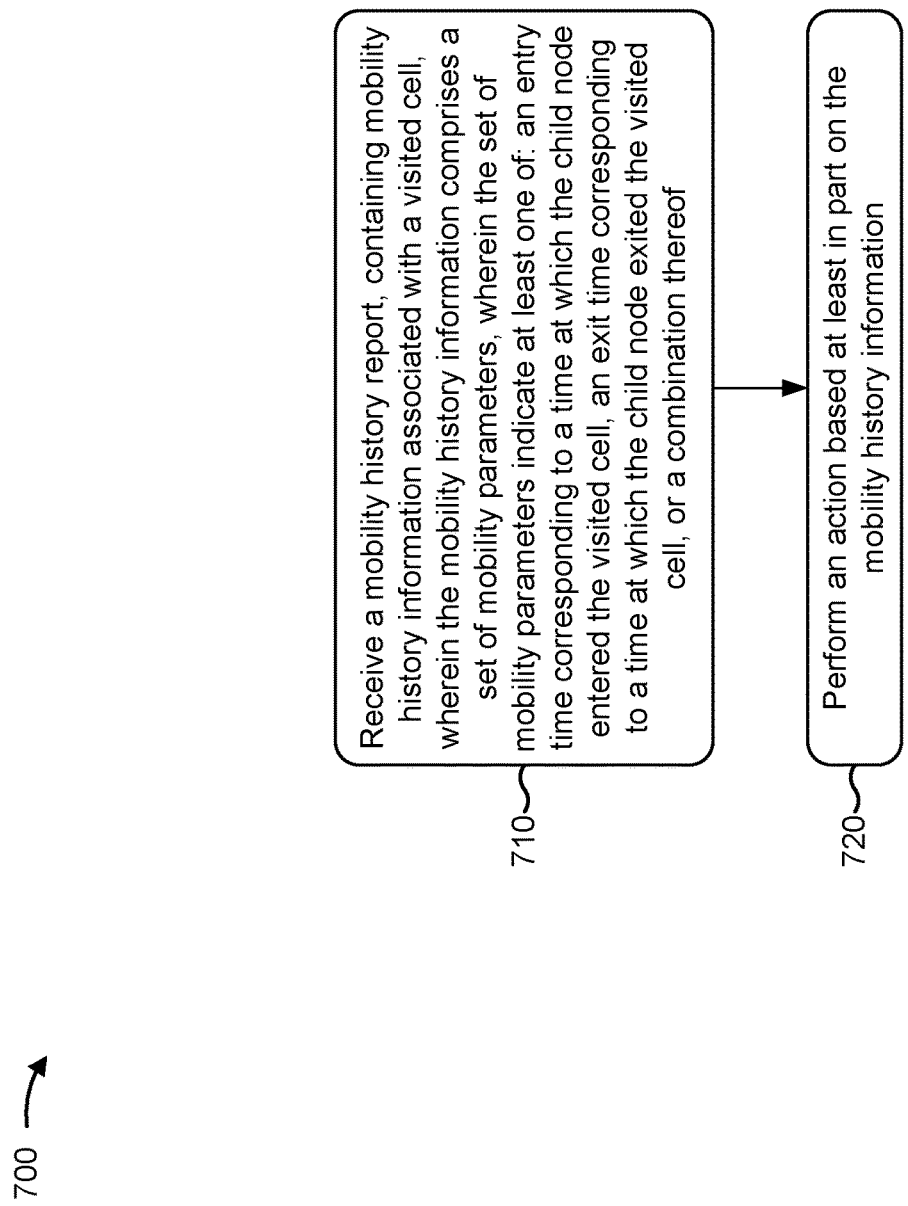

FIG. 7 is a diagram illustrating an example process 700 performed, for example, by a wireless node, in accordance with the present disclosure. Example process 700 is an example where the wireless node (e.g., wireless node 505, base station 110, UE 120, and/or the like) performs operations associated with mobility history reporting in New Radio.

As shown in FIG. 7, in some aspects, process 700 may include receiving, from a child node of the wireless node, a mobility history report, containing mobility history information associated with a visited cell, wherein the mobility history information comprises a set of mobility parameters, wherein the set of mobility parameters indicate at least one of: an entry time corresponding to a time at which the child node entered the visited cell, an exit time corresponding to a time at which the child node exited the visited cell, or a combination thereof (block 710). For example, the wireless node (e.g., using receive processor 238, receive processor 258, controller/processor 240, controller/processor 280, memory 242, memory 282, and/or the like) may receive, from a child node of the wireless node, a mobility history report, containing mobility history information associated with a visited cell, as described above. In some aspects, the mobility history information comprises a set of mobility parameters. In some aspects, the set of mobility parameters indicate at least one of an entry time corresponding to a time at which the child node entered the visited cell, an exit time corresponding to a time at which the child node exited the visited cell, or a combination thereof.

As further shown in FIG. 7, in some aspects, process 700 may include performing an action based at least in part on the mobility history information (block 720). For example, the wireless node (e.g., using transmit processor 220, transmit processor 264, receive processor 238, receive processor 258, controller/processor 240, controller/processor 280, memory 242, memory 282, and/or the like) may perform an action based at least in part on the mobility history information, as described above.

Process 700 may include additional aspects, such as any single aspect or any combination of aspects described in connection with one or more other processes described elsewhere herein.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
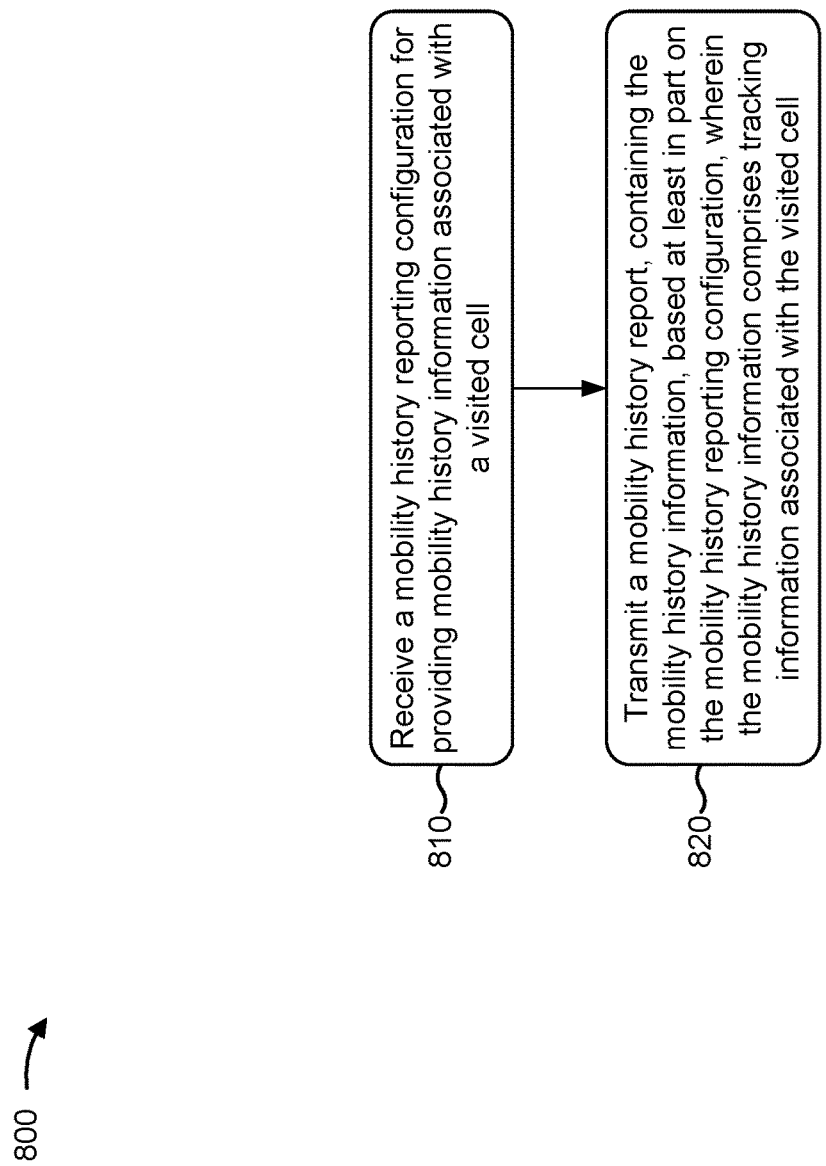

FIG. 8 is a diagram illustrating an example process 800 performed, for example, by a wireless node, in accordance with the present disclosure. Example process 800 is an example where the wireless node (e.g., wireless node 505, base station 110, UE 120, and/or the like) performs operations associated with mobility history reporting in New Radio.

As shown in FIG. 8, in some aspects, process 800 may include receiving a mobility history reporting configuration for providing mobility history information associated with a visited cell (block 810). For example, the wireless node (e.g., using receive processor 238, receive processor 258, controller/processor 240, controller/processor 280, memory 242, memory 282, and/or the like) may receive a mobility history reporting configuration for providing mobility history information associated with a visited cell, as described above.

As further shown in FIG. 8, in some aspects, process 800 may include transmitting, to a parent node of the wireless node, a mobility history report, containing the mobility history information, based at least in part on the mobility history reporting configuration, wherein the mobility history information comprises tracking information associated with the visited cell (block 820). For example, the wireless node (e.g., using transmit processor 220, transmit processor 264, controller/processor 240, controller/processor 280, memory 242, memory 282, and/or the like) may transmit, to a parent node of the wireless node, a mobility history report, containing the mobility history information, based at least in part on the mobility history reporting configuration, as described above. In some aspects, the mobility history information comprises tracking information associated with the visited cell.

Process 800 may include additional aspects, such as any single aspect or any combination of aspects described below and/or in connection with one or more other processes described elsewhere herein.

In a first aspect, the tracking information comprises mobility state information associated with the visited cell, and the mobility state information at least indicates whether the visited cell was mobile while the wireless node was visiting the visited cell.

In a second aspect, alone or in combination with the first aspect, process 800 includes receiving, from a parent node that provides the visited cell, the mobility state information.

In a third aspect, alone or in combination with one or more of the first and second aspects, the tracking information comprises location information associated with the wireless node while the wireless node was visiting the visited cell.

In a fourth aspect, alone or in combination with one or more of the first through third aspects, process 800 includes determining that a camping threshold is satisfied, wherein the camping threshold corresponds to a duration of time that the wireless node spends visiting the visited cell, wherein the tracking information comprises the location information is based at least in part on determining that the camping threshold is satisfied.

In a fifth aspect, alone or in combination with one or more of the first through fourth aspects, the visited cell comprises at least one of an IAB node, a mobile node, or a combination thereof, and the tracking information comprises the location information based at least in part on the visited cell comprising at least one of an IAB node, a mobile node, or a combination thereof.

In a sixth aspect, alone or in combination with one or more of the first through fifth aspects, the mobility history information comprises a set of mobility parameters, the set of mobility parameters indicate at least one of: a cell ID associated with the visited cell, an entry time corresponding to a time at which the wireless node entered the visited cell, an exit time corresponding to a time at which the wireless node exited the visited cell, a duration of time for which the wireless node was visiting the visited cell, or a combination thereof.

In a seventh aspect, alone or in combination with one or more of the first through sixth aspects, the mobility history information comprises: a global cell ID corresponding to the visited cell, and a physical cell ID corresponding to the visited cell.

In an eighth aspect, alone or in combination with one or more of the first through seventh aspects, the visited cell comprises at least one of an IAB node, a mobile node, or a combination thereof, and the mobility history information comprises the global cell ID and the physical cell ID based at least in part on the visited cell comprising at least one of an IAB node, a mobile node, or a combination thereof.

In a ninth aspect, alone or in combination with one or more of the first through eighth aspects, the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof.

In a tenth aspect, alone or in combination with one or more of the first through ninth aspects, the mobility history reporting configuration indicates event-triggered reporting of the mobility history information, and process 800 further comprises: detecting an occurrence of a trigger event, where the wireless node transmits the mobility history report based at least in part on detecting the occurrence of the trigger event.

In an eleventh aspect, alone or in combination with one or more of the first through tenth aspects, detecting the occurrence of the trigger event comprises determining that the wireless node visited a quantity of cells during a time period following a prior transmission of a mobility history report, where the quantity of cells satisfies a threshold.

In a twelfth aspect, alone or in combination with one or more of the first through eleventh aspects, detecting the occurrence of the trigger event comprises determining that the wireless node visited the visited cell for a duration of time that satisfies a threshold.

In a thirteenth aspect, alone or in combination with one or more of the first through twelfth aspects, detecting the occurrence of the trigger event comprises determining that the visited cell has a global cell ID that is the same as another cell, a physical cell ID of the visited cell is different than a physical ID of the other cell.

In a fourteenth aspect, alone or in combination with one or more of the first through thirteenth aspects, detecting the occurrence of the trigger event comprises determining that the visited cell has a physical cell ID that is the same as another cell, a global cell ID of the visited cell is different than a global ID of the other cell.

In a fifteenth aspect, alone or in combination with one or more of the first through fourteenth aspects, the wireless node comprises a user equipment, a distributed unit of an IAB node, or a mobile termination component of an IAB node.

In a sixteenth aspect, alone or in combination with one or more of the first through fifteenth aspects, the visited cell is provided by a parent node of the wireless node, and the parent node comprises a distributed unit of an IAB node or a mobile termination component of an IAB node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
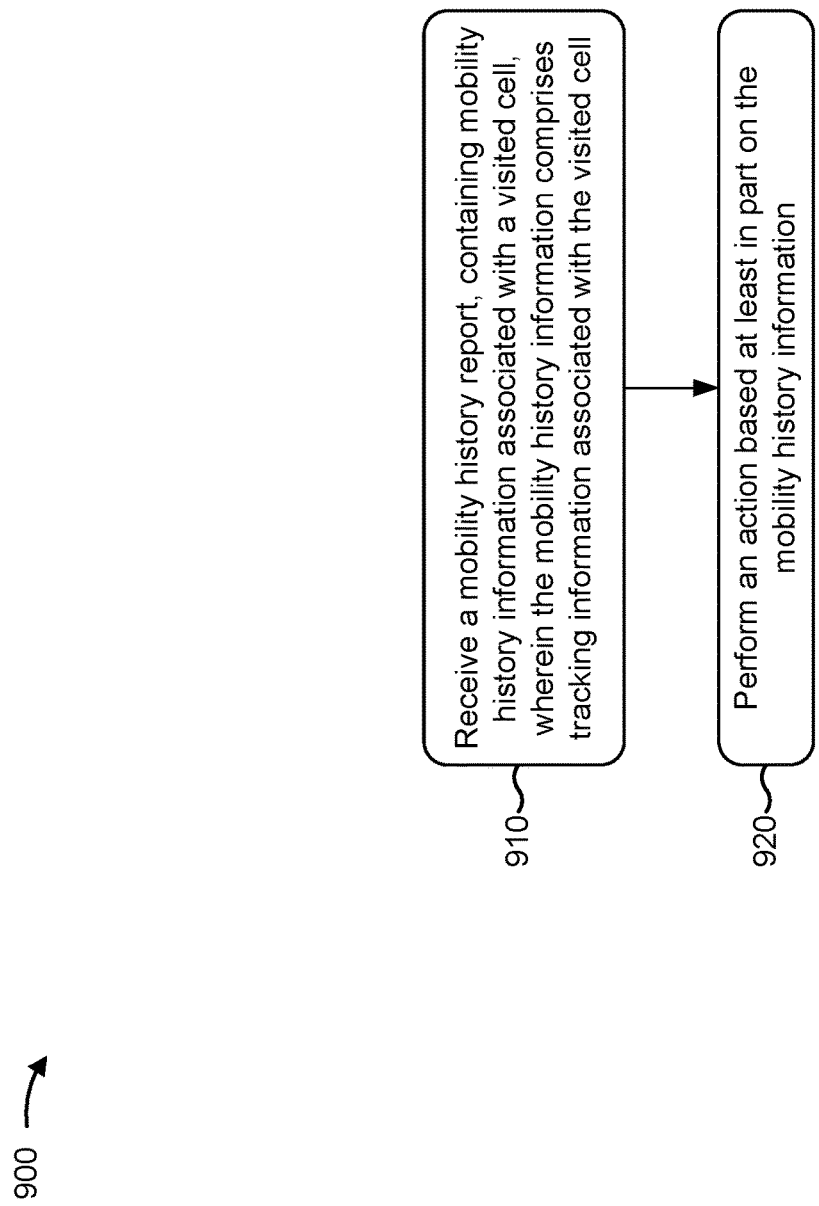

FIG. 9 is a diagram illustrating an example process 900 performed, for example, by a wireless node, in accordance with the present disclosure. Example process 900 is an example where the wireless node (e.g., wireless node 505, base station 110, UE 120, and/or the like) performs operations associated with mobility history reporting in New Radio.

As shown in FIG. 9, in some aspects, process 900 may include receiving, from a child node of the wireless node, a mobility history report, containing mobility history information associated with a visited cell, wherein the mobility history information comprises tracking information associated with the visited cell (block 910). For example, the wireless node (e.g., using receive processor 238, receive processor 258, controller/processor 240, controller/processor 280, memory 242, memory 282, and/or the like) may receive, from a child node of the wireless node, a mobility history report, containing mobility history information associated with a visited cell, as described above. In some aspects, the mobility history information comprises tracking information associated with the visited cell.

As further shown in FIG. 9, in some aspects, process 900 may include performing an action based at least in part on the mobility history information (block 920). For example, the wireless node (e.g., using transmit processor 220, transmit processor 264, receive processor 238, receive processor 258, controller/processor 240, controller/processor 280, memory 242, memory 282, and/or the like) may perform an action based at least in part on the mobility history information, as described above.

Process 900 may include additional aspects, such as any single aspect or any combination of aspects described in connection with one or more other processes described elsewhere herein.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
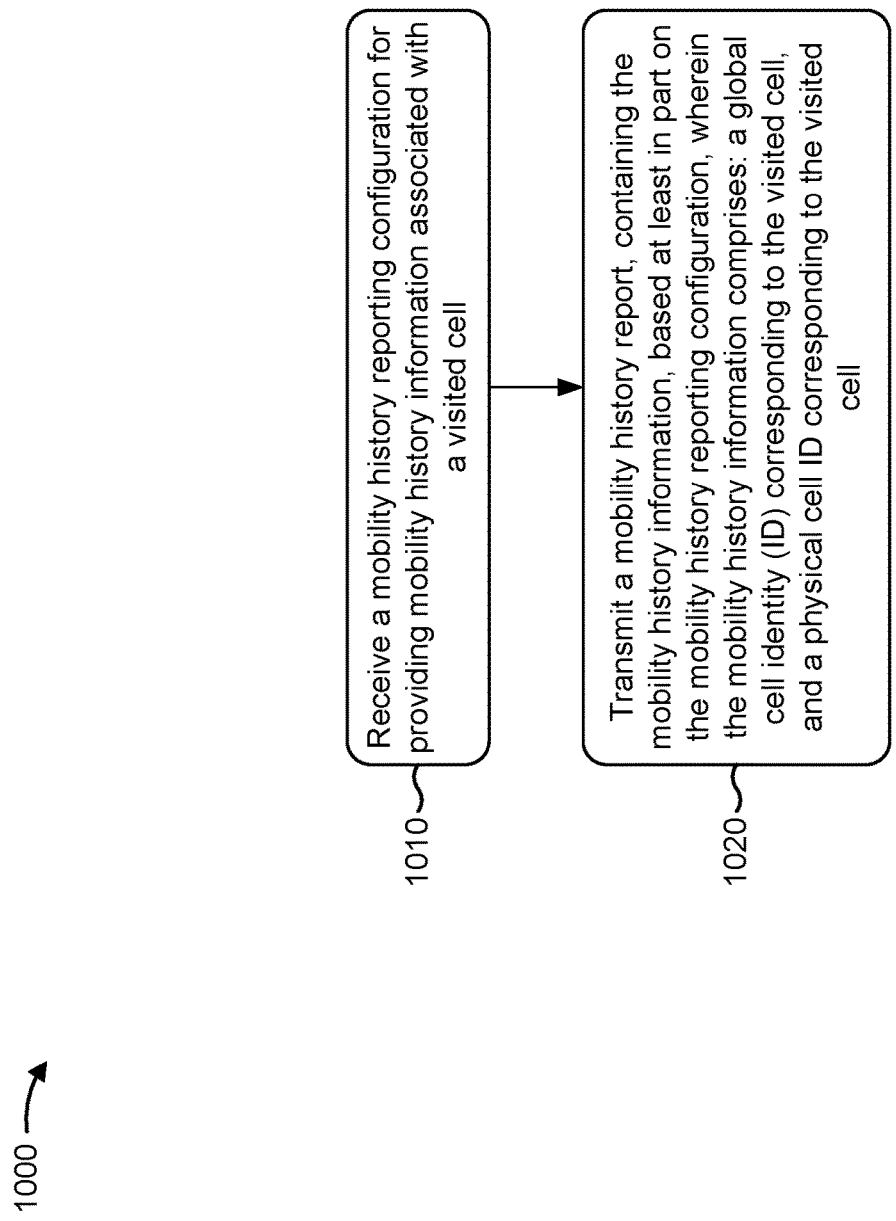

FIG. 10 is a diagram illustrating an example process 1000 performed, for example, by a wireless node, in accordance with the present disclosure. Example process 1000 is an example where the wireless node (e.g., wireless node 505, base station 110, UE 120, and/or the like) performs operations associated with mobility history reporting in New Radio.

As shown in FIG. 10, in some aspects, process 1000 may include receiving a mobility history reporting configuration for providing mobility history information associated with a visited cell (block 1010). For example, the wireless node (e.g., using receive processor 238, receive processor 258, controller/processor 240, controller/processor 280, memory 242, memory 282, and/or the like) may receive a mobility history reporting configuration for providing mobility history information associated with a visited cell, as described above.

As further shown in FIG. 10, in some aspects, process 1000 may include transmitting, to a parent node of the wireless node, a mobility history report, containing the mobility history information, based at least in part on the mobility history reporting configuration, wherein the mobility history information comprises: a global cell ID corresponding to the visited cell, and a physical cell ID corresponding to the visited cell (block 1020). For example, the wireless node (e.g., using transmit processor 220, transmit processor 264, controller/processor 240, controller/processor 280, memory 242, memory 282, and/or the like) may transmit, to a parent node of the wireless node, a mobility history report, containing the mobility history information, based at least in part on the mobility history reporting configuration, as described above. In some aspects, the mobility history information comprises a global cell ID corresponding to the visited cell and a physical cell ID corresponding to the visited cell.

Process 1000 may include additional aspects, such as any single aspect or any combination of aspects described below and/or in connection with one or more other processes described elsewhere herein.

In a first aspect, the visited cell comprises at least one of an IAB node, a mobile node, or a combination thereof, and the mobility history information comprises the global cell ID and the physical cell ID based at least in part on the visited cell comprising at least one of an IAB node, a mobile node, or a combination thereof.

In a second aspect, alone or in combination with the first aspect, the mobility history information comprises a set of mobility parameters, the set of mobility parameters indicate at least one of: a cell ID associated with the visited cell, an entry time corresponding to a time at which the wireless node entered the visited cell, an exit time corresponding to a time at which the wireless node exited the visited cell, a duration of time for which the wireless node was visiting the visited cell, or a combination thereof.

In a third aspect, alone or in combination with one or more of the first and second aspects, the mobility history information comprises tracking information associated with the visited cell.

In a fourth aspect, alone or in combination with one or more of the first through third aspects, the tracking information comprises mobility state information associated with the visited cell, the mobility state information at least indicates whether the visited cell was mobile while the wireless node was visiting the visited cell.

In a fifth aspect, alone or in combination with one or more of the first through fourth aspects, process 1000 includes receiving, from a parent node that provides the visited cell, the mobility state information.

In a sixth aspect, alone or in combination with one or more of the first through fifth aspects, the tracking information comprises location information associated with the wireless node while the wireless node was visiting the visited cell.

In a seventh aspect, alone or in combination with one or more of the first through sixth aspects, process 1000 includes determining that a camping threshold is satisfied, wherein the camping threshold corresponds to a duration of time that the wireless node spends visiting the visited cell, wherein the tracking information comprises the location information is based at least in part on determining that the camping threshold is satisfied.

In an eighth aspect, alone or in combination with one or more of the first through seventh aspects, the visited cell comprises at least one of an IAB node, a mobile node, or a combination thereof, and the tracking information comprises the location information based at least in part on the visited cell comprising at least one of an IAB node, a mobile node, or a combination thereof.

In a ninth aspect, alone or in combination with one or more of the first through eighth aspects, the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof.

In a tenth aspect, alone or in combination with one or more of the first through ninth aspects, the mobility history reporting configuration indicates event-triggered reporting of the mobility history information, and process 1000 further includes: detecting an occurrence of a trigger event, where the wireless node transmits the mobility history report based at least in part on detecting the occurrence of the trigger event.

In an eleventh aspect, alone or in combination with one or more of the first through tenth aspects, detecting the occurrence of the trigger event comprises determining that the wireless node visited a quantity of cells during a time period following a prior transmission of a mobility history report, the quantity of cells satisfies a threshold.

In a twelfth aspect, alone or in combination with one or more of the first through eleventh aspects, detecting the occurrence of the trigger event comprises determining that the wireless node visited the visited cell for a duration of time that satisfies a threshold.

In a thirteenth aspect, alone or in combination with one or more of the first through twelfth aspects, detecting the occurrence of the trigger event comprises determining that the visited cell has a global cell ID that is the same as another cell, the physical cell ID of the visited cell is different than a physical ID of the other cell.

In a fourteenth aspect, alone or in combination with one or more of the first through thirteenth aspects, detecting the occurrence of the trigger event comprises determining that the visited cell has a physical cell ID that is the same as another cell, the global cell ID of the visited cell is different than a global ID of the other cell.

In a fifteenth aspect, alone or in combination with one or more of the first through fourteenth aspects, the wireless node comprises a user equipment, a distributed unit of an IAB node, or a mobile termination component of an IAB node.

In a sixteenth aspect, alone or in combination with one or more of the first through fifteenth aspects, the visited cell is provided by a parent node of the wireless node, and the parent node comprises a distributed unit of an IAB node or a mobile termination component of an IAB node.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
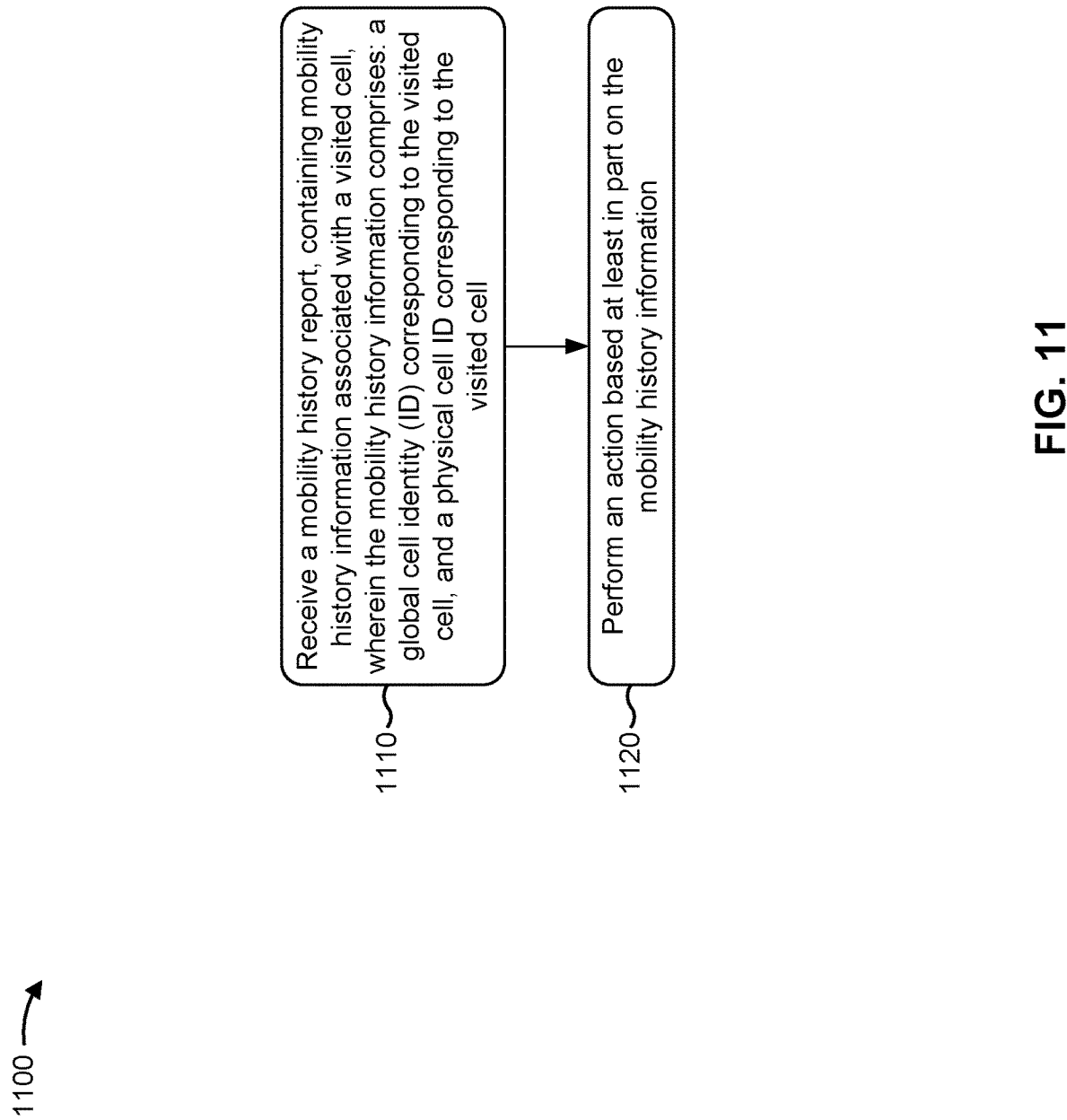

FIG. 11 is a diagram illustrating an example process 1100 performed, for example, by a wireless node, in accordance with the present disclosure. Example process 1100 is an example where the wireless node (e.g., wireless node 505, base station 110, UE 120, and/or the like) performs operations associated with mobility history reporting in New Radio.

As shown in FIG. 11, in some aspects, process 1100 may include receiving, from a child node of the wireless node, a mobility history report, containing mobility history information associated with a visited cell, wherein the mobility history information comprises: a global cell ID corresponding to the visited cell, and a physical cell ID corresponding to the visited cell, and performing an action based at least in part on the mobility history information (block 1110). For example, the wireless node (e.g., using receive processor 238, receive processor 258, controller/processor 240, controller/processor 280, memory 242, memory 282, and/or the like) may receive, from a child node of the wireless node, a mobility history report, containing mobility history information associated with a visited cell, as described above. In some aspects, the mobility history information comprises a global cell ID corresponding to the visited cell, and a physical cell ID corresponding to the visited cell.

As shown in FIG. 1100, in some aspects, process 1100 may include performing an action based at least in part on the mobility history information (block 1120). For example, the wireless node (e.g., transmit processor 220, transmit processor 264, using receive processor 238, receive processor 258, controller/processor 240, controller/processor 280, memory 242, memory 282, and/or the like) may receive a mobility history reporting configuration for providing mobility history information associated with a visited cell, as described above.

Process 1100 may include additional aspects, such as any single aspect or any combination of aspects described in connection with one or more other processes described elsewhere herein.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
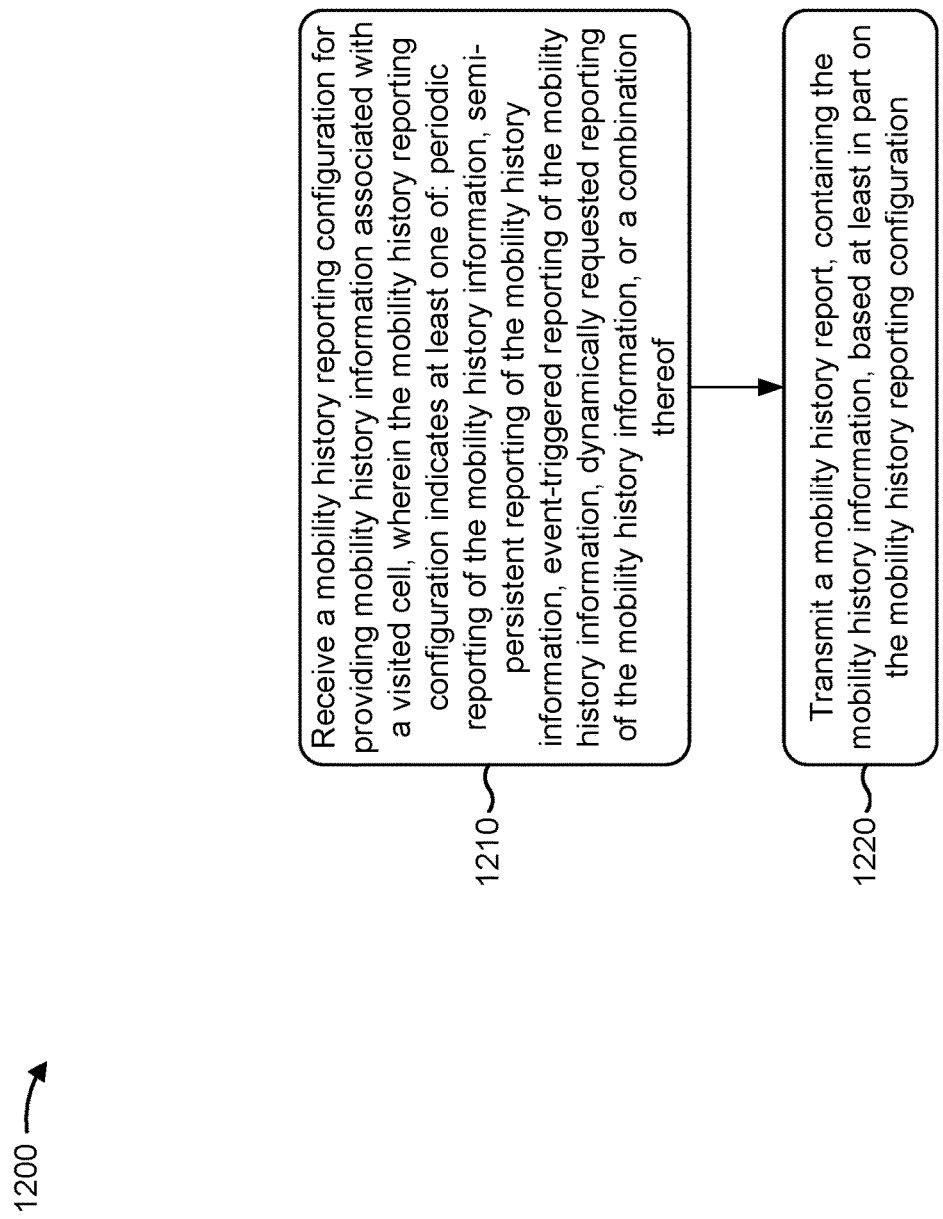

FIG. 12 is a diagram illustrating an example process 1200 performed, for example, by a wireless node, in accordance with the present disclosure. Example process 1200 is an example where the wireless node (e.g., wireless node 505, base station 110, UE 120, and/or the like) performs operations associated with mobility history reporting in New Radio.

As shown in FIG. 12, in some aspects, process 1200 may include receiving a mobility history reporting configuration for providing mobility history information associated with a visited cell, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof (block 1210). For example, the wireless node (e.g., using receive processor 238, receive processor 258, controller/processor 240, controller/processor 280, memory 242, memory 282, and/or the like) may receive a mobility history reporting configuration for providing mobility history information associated with a visited cell, as described above. In some aspects, the mobility history reporting configuration indicates at least one of periodic reporting of the mobility history information, semi-persistent reporting of the mobility history information, event-triggered reporting of the mobility history information, dynamically requested reporting of the mobility history information, or a combination thereof.

As further shown in FIG. 12, in some aspects, process 1200 may include transmitting, to a parent node of the wireless node, a mobility history report, containing the mobility history information, based at least in part on the mobility history reporting configuration (block 1220). For example, the wireless node (e.g., using transmit processor 220, transmit processor 264, controller/processor 240, controller/processor 280, memory 242, memory 282, and/or the like) may transmit, to a parent node of the wireless node, a mobility history report, containing the mobility history information, based at least in part on the mobility history reporting configuration, as described above.

Process 1200 may include additional aspects, such as any single aspect or any combination of aspects described below and/or in connection with one or more other processes described elsewhere herein.

In a first aspect, the mobility history reporting configuration indicates event-triggered reporting of the mobility history information, and process 1200 further includes: detecting an occurrence of a trigger event, where the wireless node transmits the mobility history report based at least in part on detecting the occurrence of the trigger event.

In a second aspect, alone or in combination with the first aspect, detecting the occurrence of the trigger event comprises determining that the wireless node visited a quantity of cells during a time period following a prior transmission of a mobility history report, the quantity of cells satisfies a threshold.

In a third aspect, alone or in combination with one or more of the first and second aspects, detecting the occurrence of the trigger event comprises determining that the wireless node visited the visited cell for a duration of time that satisfies a threshold.

In a fourth aspect, alone or in combination with one or more of the first through third aspects, detecting the occurrence of the trigger event comprises determining that the visited cell has a global cell ID that is the same as another cell, a physical cell ID of the visited cell is different than a physical ID of the other cell.

In a fifth aspect, alone or in combination with one or more of the first through fourth aspects, detecting the occurrence of the trigger event comprises determining that the visited cell has a physical cell ID that is the same as another cell, a global cell ID of the visited cell is different than a global ID of the other cell.

In a sixth aspect, alone or in combination with one or more of the first through fifth aspects, the mobility history information comprises a set of mobility parameters, the set of mobility parameters indicate at least one of: a cell ID associated with the visited cell, an entry time corresponding to a time at which the wireless node entered the visited cell, an exit time corresponding to a time at which the wireless node exited the visited cell, a duration of time for which the wireless node was visiting the visited cell, or a combination thereof.

In a seventh aspect, alone or in combination with one or more of the first through sixth aspects, the mobility history information comprises tracking information associated with the visited cell.

In an eighth aspect, alone or in combination with one or more of the first through seventh aspects, the tracking information comprises mobility state information associated with the visited cell, the mobility state information at least indicates whether the visited cell was mobile while the wireless node was visiting the visited cell.

In a ninth aspect, alone or in combination with one or more of the first through eighth aspects, process 1200 includes receiving, from a parent node that provides the visited cell, the mobility state information.

In a tenth aspect, alone or in combination with one or more of the first through ninth aspects, the tracking information comprises location information associated with the wireless node while the wireless node was visiting the visited cell.

In an eleventh aspect, alone or in combination with one or more of the first through tenth aspects, process 1200 includes determining that a camping threshold is satisfied, wherein the camping threshold corresponds to a duration of time that the wireless node spends visiting the visited cell, wherein the tracking information comprises the location information is based at least in part on determining that the camping threshold is satisfied.

In a twelfth aspect, alone or in combination with one or more of the first through eleventh aspects, the visited cell comprises at least one of an IAB node, a mobile node, or a combination thereof, and the tracking information comprises the location information based at least in part on the visited cell comprising at least one of an IAB node, a mobile node, or a combination thereof.

In a thirteenth aspect, alone or in combination with one or more of the first through twelfth aspects, the mobility history information comprises: a global cell ID corresponding to the visited cell, and a physical cell ID corresponding to the visited cell.

In a fourteenth aspect, alone or in combination with one or more of the first through thirteenth aspects, the visited cell comprises at least one of an IAB node, a mobile node, or a combination thereof, and the mobility history information comprises the global cell ID and the physical cell ID based at least in part on the visited cell comprising at least one of an IAB node, a mobile node, or a combination thereof.

In a fifteenth aspect, alone or in combination with one or more of the first through fourteenth aspects, the wireless node comprises a user equipment, a distributed unit of an IAB node, or a mobile termination component of an IAB node.

In a sixteenth aspect, alone or in combination with one or more of the first through fifteenth aspects, the visited cell is provided by a parent node of the wireless node, and the parent node comprises a distributed unit of an IAB node or a mobile termination component of an IAB node.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a wireless node, in accordance with the present disclosure. Example process 1300 is an example where the wireless node (e.g., wireless node 505, base station 110, UE 120, and/or the like) performs operations associated with mobility history reporting in New Radio.

As shown in FIG. 13, in some aspects, process 1300 may include transmitting, to a child node of the wireless node, a mobility history reporting configuration for providing mobility history information associated with a visited cell, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof (block 1310). For example, the wireless node (e.g., using transmit processor 220, transmit processor 264, controller/processor 240, controller/processor 280, memory 242, memory 282, and/or the like) may transmit, to a child node of the wireless node, a mobility history reporting configuration for providing mobility history information associated with a visited cell, as described above. In some aspects, the mobility history reporting configuration indicates at least one of periodic reporting of the mobility history information, semi-persistent reporting of the mobility history information, event-triggered reporting of the mobility history information, dynamically requested reporting of the mobility history information, or a combination thereof.

As further shown in FIG. 13, in some aspects, process 1300 may include receiving, from the child node of the wireless node, a mobility history report, containing the mobility history information, based at least in part on the mobility history reporting configuration (block 1320). For example, the wireless node (e.g., using receive processor 238, receive processor 258, controller/processor 240, controller/processor 280, memory 242, memory 282, and/or the like) may receive, from the child node of the wireless node, a mobility history report, containing the mobility history information, based at least in part on the mobility history reporting configuration, as described above.

Process 1300 may include additional aspects, such as any single aspect or any combination of aspects described in connection with one or more other processes described elsewhere herein.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The following provides an overview of some Aspects of the present disclosure:

Aspect 1: A method of wireless communication performed by a wireless node in a wireless network, comprising: receiving a mobility history reporting configuration for providing mobility history information associated with a visited cell; and transmitting, to a parent node of the wireless node, a mobility history report, containing the mobility history information, based at least in part on the mobility history reporting configuration, wherein the mobility history information comprises a set of mobility parameters, wherein the set of mobility parameters indicate at least one of: an entry time corresponding to a time at which the wireless node entered the visited cell, an exit time corresponding to a time at which the wireless node exited the visited cell, or a combination thereof.

Aspect 2: The method of Aspect 1, wherein the set of mobility parameters further indicate at least one of: a cell identity (ID) associated with the visited cell, a duration of time for which the wireless node was visiting the visited cell, or a combination thereof.

Aspect 3: The method of either of Aspects 1 or 2, wherein the mobility history information comprises tracking information associated with the visited cell.

Aspect 4: The method of Aspect 3, wherein the tracking information comprises mobility state information associated with the visited cell, wherein the mobility state information at least indicates whether the visited cell was mobile while the wireless node was visiting the visited cell.

Aspect 5: The method of Aspect 4, further comprising receiving, from a parent node that provides the visited cell, the mobility state information.

Aspect 6: The method of either of Aspects 3 or 4, wherein the tracking information comprises location information associated with the wireless node while the wireless node was visiting the visited cell.

Aspect 7: The method of Aspect 6, further comprising: determining that a camping threshold is satisfied, wherein the camping threshold corresponds to a duration of time that the wireless node spends visiting the visited cell, wherein the tracking information comprises the location information based at least in part on determining that the camping threshold is satisfied.

Aspect 8: The method of either of Aspects 6 or 7, wherein the visited cell comprises at least one of an integrated access and backhaul (IAB) node, a mobile node, or a combination thereof, and wherein the tracking information comprises the location information based at least in part on the visited cell comprising at least one of an IAB node, a mobile node, or a combination thereof.

Aspect 9: The method of any of Aspects 1-8, wherein the mobility history information comprises: a global cell identity (ID) corresponding to the visited cell; and a physical cell ID corresponding to the visited cell.

Aspect 10: The method of Aspect 9, wherein the visited cell comprises at least one of an integrated access and backhaul (IAB) node, a mobile node, or a combination thereof, and wherein the mobility history information comprises the global cell ID and the physical cell ID based at least in part on the visited cell comprising at least one of an IAB node, a mobile node, or a combination thereof.

Aspect 11: The method of any of Aspects 1-10, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof.

Aspect 12: The method of any of Aspects 1-11, wherein the mobility history reporting configuration indicates event-triggered reporting of the mobility history information, and wherein the method further comprises: detecting an occurrence of a trigger event, wherein the wireless node transmits the mobility history report based at least in part on detecting the occurrence of the trigger event.

Aspect 13: The method of Aspect 12, wherein detecting the occurrence of the trigger event comprises determining that the wireless node visited a quantity of cells during a time period following a prior transmission of a mobility history report, wherein the quantity of cells satisfies a threshold.

Aspect 14: The method of either of Aspects 12 or 13, wherein detecting the occurrence of the trigger event comprises determining that the wireless node visited the visited cell for a duration of time that satisfies a threshold.

Aspect 15: The method of any of Aspects 12-14, wherein detecting the occurrence of the trigger event comprises determining that the visited cell has a global cell ID that is the same as another cell, wherein a physical cell ID of the visited cell is different than a physical ID of the other cell.

Aspect 16: The method of any of Aspects 12-15, wherein detecting the occurrence of the trigger event comprises determining that the visited cell has a physical cell ID that is the same as another cell, wherein a global cell ID of the visited cell is different than a global ID of the other cell.

Aspect 17: The method of any of Aspects 1-16, wherein the wireless node comprises a user equipment, a distributed unit of an integrated access and backhaul (IAB) node, or a mobile termination component of an IAB node.

Aspect 18: The method of any of Aspects 1-17, wherein the visited cell is provided by a parent node of the wireless node, and wherein the parent node comprises a distributed unit of an integrated access and backhaul (IAB) node or a mobile termination component of an IAB node.

Aspect 19: A method of wireless communication performed by a wireless node, comprising: receiving, from a child node of the wireless node, a mobility history report, containing mobility history information associated with a visited cell, wherein the mobility history information comprises a set of mobility parameters, wherein the set of mobility parameters indicate at least one of: an entry time corresponding to a time at which the child node entered the visited cell, an exit time corresponding to a time at which the child node exited the visited cell, or a combination thereof; and performing an action based at least in part on the mobility history information.

Aspect 20: The method of Aspect 19, wherein the set of mobility parameters further indicate at least one of: a cell identity (ID) associated with the visited cell, a duration of time for which the wireless node was visiting the visited cell, or a combination thereof.

Aspect 21: The method of either of Aspects 19 or 20, wherein the mobility history information comprises tracking information associated with the visited cell.

Aspect 22: The method of Aspect 21, wherein the tracking information comprises mobility state information associated with the visited cell, wherein the mobility state information at least indicates whether the visited cell was mobile while the wireless node was visiting the visited cell.

Aspect 23: The method of Aspect 22, wherein the tracking information comprises location information associated with the wireless node while the wireless node was visiting the visited cell.

Aspect 24: The method of Aspect 23, wherein the tracking information comprises the location information based at least in part on a determination that a camping threshold is satisfied, wherein the camping threshold corresponds to a duration of time that the wireless node spends visiting the visited cell.

Aspect 25: The method of either of Aspects 22 or 23, wherein the visited cell comprises at least one of an integrated access and backhaul (IAB) node, a mobile node, or a combination thereof, and wherein the tracking information comprises the location information based at least in part on the visited cell comprising at least one of an IAB node, a mobile node, or a combination thereof.

Aspect 26: The method of any of Aspects 19-25, wherein the mobility history information comprises: a global cell identity (ID) corresponding to the visited cell; and a physical cell ID corresponding to the visited cell.

Aspect 27: The method of Aspect 26, wherein the visited cell comprises at least one of an integrated access and backhaul (IAB) node, a mobile node, or a combination thereof, and wherein the mobility history information comprises the global cell ID and the physical cell ID based at least in part on the visited cell comprising at least one of an IAB node, a mobile node, or a combination thereof.

Aspect 28: The method of any of Aspects 19-27, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof.

Aspect 29: The method of any of Aspects 19-28, wherein the mobility history reporting configuration indicates event-triggered reporting of the mobility history information, and wherein the method further comprises receiving the mobility history report based at least in part on a detection of an occurrence of a trigger event.

Aspect 30: The method of Aspect 29, wherein the detection of the occurrence of the trigger event comprises a determination that the wireless node visited a quantity of cells during a time period following a prior transmission of a mobility history report, wherein the quantity of cells satisfies a threshold.

Aspect 31: The method of either of Aspects 29 or 30, wherein the detection of the occurrence of the trigger event comprises a determination that the wireless node visited the visited cell for a duration of time that satisfies a threshold.

Aspect 32: The method of any of Aspects 29-32, wherein the detection of the occurrence of the trigger event comprises a determination that the visited cell has a global cell ID that is the same as another cell, wherein a physical cell ID of the visited cell is different than a physical ID of the other cell.

Aspect 33: The method of any of Aspects 29-32, wherein the detection of the occurrence of the trigger event comprises a determination that the visited cell has a physical cell ID that is the same as another cell, wherein a global cell ID of the visited cell is different than a global ID of the other cell.

Aspect 34: The method of any of Aspects 19-33, wherein the wireless node comprises a user equipment, a distributed unit of an integrated access and backhaul (IAB) node, or a mobile termination component of an IAB node.

Aspect 35: The method of any of Aspects 19-34, wherein the visited cell is provided by a parent node of the wireless node, and wherein the parent node comprises a distributed unit of an integrated access and backhaul (IAB) node or a mobile termination component of an IAB node.

Aspect 36: A method of wireless communication performed by a wireless node in a wireless network, comprising: receiving a mobility history reporting configuration for providing mobility history information associated with a visited cell; and transmitting, to a parent node of the wireless node, a mobility history report, containing the mobility history information, based at least in part on the mobility history reporting configuration, wherein the mobility history information comprises tracking information associated with the visited cell.

Aspect 37: The method of Aspect 36, wherein the tracking information comprises mobility state information associated with the visited cell, wherein the mobility state information at least indicates whether the visited cell was mobile while the wireless node was visiting the visited cell.

Aspect 38: The method of Aspect 37, further comprising receiving, from a parent node that provides the visited cell, the mobility state information.

Aspect 39: The method of either of Aspects 36 or 37, wherein the tracking information comprises location information associated with the wireless node while the wireless node was visiting the visited cell.

Aspect 40: The method of Aspect 39, further comprising: determining that a camping threshold is satisfied, wherein the camping threshold corresponds to a duration of time that the wireless node spends visiting the visited cell, wherein the tracking information comprises the location information based at least in part on determining that the camping threshold is satisfied.

Aspect 41: The method of either of Aspects 39 or 40, wherein the visited cell comprises at least one of an integrated access and backhaul (IAB) node, a mobile node, or a combination thereof, and wherein the tracking information comprises the location information based at least in part on the visited cell comprising at least one of an IAB node, a mobile node, or a combination thereof.

Aspect 42: The method of any of Aspects 36-41, wherein the mobility history information comprises a set of mobility parameters, wherein the set of mobility parameters indicate at least one of: a cell identity (ID) associated with the visited cell, an entry time corresponding to a time at which the wireless node entered the visited cell, an exit time corresponding to a time at which the wireless node exited the visited cell, a duration of time for which the wireless node was visiting the visited cell, or a combination thereof.

Aspect 43: The method of any of Aspects 36-42, wherein the mobility history information comprises: a global cell identity (ID) corresponding to the visited cell; and a physical cell ID corresponding to the visited cell.

Aspect 44: The method of Aspect 43, wherein the visited cell comprises at least one of an integrated access and backhaul (IAB) node, a mobile node, or a combination thereof, and wherein the mobility history information comprises the global cell ID and the physical cell ID based at least in part on the visited cell comprising at least one of an IAB node, a mobile node, or a combination thereof.

Aspect 45: The method of any of Aspects 36-44, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof.

Aspect 46: The method of any of Aspects 36-45, wherein the mobility history reporting configuration indicates event-triggered reporting of the mobility history information, and wherein the method further comprises: detecting an occurrence of a trigger event, wherein the wireless node transmits the mobility history report based at least in part on detecting the occurrence of the trigger event.

Aspect 47: The method of Aspect 46, wherein detecting the occurrence of the trigger event comprises determining that the wireless node visited a quantity of cells during a time period following a prior transmission of a mobility history report, wherein the quantity of cells satisfies a threshold.

Aspect 48: The method of either of Aspects 46 or 47, wherein detecting the occurrence of the trigger event comprises determining that the wireless node visited the visited cell for a duration of time that satisfies a threshold.

Aspect 49: The method of any of Aspects 46-48, wherein detecting the occurrence of the trigger event comprises determining that the visited cell has a global cell ID that is the same as another cell, wherein a physical cell ID of the visited cell is different than a physical ID of the other cell.

Aspect 50: The method of any of Aspects 46-49, wherein detecting the occurrence of the trigger event comprises determining that the visited cell has a physical cell ID that is the same as another cell, wherein a global cell ID of the visited cell is different than a global ID of the other cell.

Aspect 51: The method of any of Aspects 36-50, wherein the wireless node comprises a user equipment, a distributed unit of an integrated access and backhaul (IAB) node, or a mobile termination component of an IAB node.

Aspect 52: The method of any of Aspects 36-51, wherein the visited cell is provided by a parent node of the wireless node, and wherein the parent node comprises a distributed unit of an integrated access and backhaul (IAB) node or a mobile termination component of an IAB node.

Aspect 53: A method of wireless communication performed by a wireless node, comprising: receiving, from a child node of the wireless node, a mobility history report, containing mobility history information associated with a visited cell, wherein the mobility history information comprises tracking information associated with the visited cell; and performing an action based at least in part on the mobility history information.

Aspect 54: The method of Aspect 53, wherein the tracking information comprises mobility state information associated with the visited cell, wherein the mobility state information at least indicates whether the visited cell was mobile while the wireless node was visiting the visited cell.

Aspect 55: The method of either of Aspects 53 or 54, wherein the tracking information comprises location information associated with the wireless node while the wireless node was visiting the visited cell.

Aspect 56: The method of Aspect 55, wherein the tracking information comprises the location information based at least in part on a determination that a camping threshold is satisfied, wherein the camping threshold corresponds to a duration of time that the wireless node spends visiting the visited cell.

Aspect 57: The method of either of Aspects 55 or 56, wherein the visited cell comprises at least one of an integrated access and backhaul (IAB) node, a mobile node, or a combination thereof, and wherein the tracking information comprises the location information based at least in part on the visited cell comprising at least one of an IAB node, a mobile node, or a combination thereof.

Aspect 58: The method of any of Aspects 53-57, wherein the mobility history information comprises a set of mobility parameters, wherein the set of mobility parameters indicate at least one of: a cell identity (ID) associated with the visited cell, an entry time corresponding to a time at which the wireless node entered the visited cell, an exit time corresponding to a time at which the wireless node exited the visited cell, a duration of time for which the wireless node was visiting the visited cell, or a combination thereof.

Aspect 59: The method of any of Aspects 53-58, wherein the mobility history information comprises: a global cell identity (ID) corresponding to the visited cell; and a physical cell ID corresponding to the visited cell.

Aspect 60: The method of Aspect 59, wherein the visited cell comprises at least one of an integrated access and backhaul (IAB) node, a mobile node, or a combination thereof, and wherein the mobility history information comprises the global cell ID and the physical cell ID based at least in part on the visited cell comprising at least one of an IAB node, a mobile node, or a combination thereof.

Aspect 61: The method of any of Aspects 53-60, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof.

Aspect 62: The method of any of Aspects 53-61, wherein the mobility history reporting configuration indicates event-triggered reporting of the mobility history information, and wherein the method further comprises receiving the mobility history report based at least in part on a detection of an occurrence of a trigger event.

Aspect 63: The method of Aspect 62, wherein the detection of the occurrence of the trigger event comprises a determination that the wireless node visited a quantity of cells during a time period following a prior transmission of a mobility history report, wherein the quantity of cells satisfies a threshold.

Aspect 64: The method of either of Aspects 62 or 63, wherein the detection of the occurrence of the trigger event comprises a determination that the wireless node visited the visited cell for a duration of time that satisfies a threshold.

Aspect 65: The method of any of Aspects 62-64, wherein the detection of the occurrence of the trigger event comprises a determination that the visited cell has a global cell ID that is the same as another cell, wherein a physical cell ID of the visited cell is different than a physical ID of the other cell.

Aspect 66: The method of any of Aspects 62-65, wherein the detection of the occurrence of the trigger event comprises a determination that the visited cell has a physical cell ID that is the same as another cell, wherein a global cell ID of the visited cell is different than a global ID of the other cell.

Aspect 67: The method of any of Aspects 53-66, wherein the wireless node comprises a user equipment, a distributed unit of an integrated access and backhaul (IAB) node, or a mobile termination component of an IAB node.

Aspect 68: The method of any of Aspects 53-67, wherein the visited cell is provided by a parent node of the wireless node, and wherein the parent node comprises a distributed unit of an integrated access and backhaul (IAB) node or a mobile termination component of an IAB node.

Aspect 69: A method of wireless communication performed by a wireless node in a wireless network, comprising: receiving a mobility history reporting configuration for providing mobility history information associated with a visited cell; and transmitting, to a parent node of the wireless node, a mobility history report, containing the mobility history information, based at least in part on the mobility history reporting configuration, wherein the mobility history information comprises: a global cell identity (ID) corresponding to the visited cell, and a physical cell ID corresponding to the visited cell.

Aspect 70: The method of Aspect 69, wherein the visited cell comprises at least one of an integrated access and backhaul (IAB) node, a mobile node, or a combination thereof, and wherein the mobility history information comprises the global cell ID and the physical cell ID based at least in part on the visited cell comprising at least one of an IAB node, a mobile node, or a combination thereof.

Aspect 71: The method of either of Aspects 69 or 70, wherein the mobility history information comprises a set of mobility parameters, wherein the set of mobility parameters indicate at least one of: a cell identity (ID) associated with the visited cell, an entry time corresponding to a time at which the wireless node entered the visited cell, an exit time corresponding to a time at which the wireless node exited the visited cell, a duration of time for which the wireless node was visiting the visited cell, or a combination thereof.

Aspect 72: The method of any of Aspects 69-71, wherein the mobility history information comprises tracking information associated with the visited cell.

Aspect 73: The method of Aspect 72, wherein the tracking information comprises mobility state information associated with the visited cell, wherein the mobility state information at least indicates whether the visited cell was mobile while the wireless node was visiting the visited cell.

Aspect 74: The method of Aspect 73, further comprising receiving, from a parent node that provides the visited cell, the mobility state information.

Aspect 75: The method of any of Aspects 72-74, wherein the tracking information comprises location information associated with the wireless node while the wireless node was visiting the visited cell.

Aspect 76: The method of Aspect 75, further comprising: determining that a camping threshold is satisfied, wherein the camping threshold corresponds to a duration of time that the wireless node spends visiting the visited cell, wherein the tracking information comprises the location information based at least in part on determining that the camping threshold is satisfied.

Aspect 77: The method of either of Aspects 75 or 76, wherein the visited cell comprises at least one of an integrated access and backhaul (IAB) node, a mobile node, or a combination thereof, and wherein the tracking information comprises the location information based at least in part on the visited cell comprising at least one of an IAB node, a mobile node, or a combination thereof.

Aspect 78: The method of any of Aspects 69-77, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof.

Aspect 79: The method of any of Aspects 69-78, wherein the mobility history reporting configuration indicates event-triggered reporting of the mobility history information, and wherein the method further comprises: detecting an occurrence of a trigger event, wherein the wireless node transmits the mobility history report based at least in part on detecting the occurrence of the trigger event.

Aspect 80: The method of Aspect 79, wherein detecting the occurrence of the trigger event comprises determining that the wireless node visited a quantity of cells during a time period following a prior transmission of a mobility history report, wherein the quantity of cells satisfies a threshold.

Aspect 81: The method of either of Aspects 79 or 80, wherein detecting the occurrence of the trigger event comprises determining that the wireless node visited the visited cell for a duration of time that satisfies a threshold.

Aspect 82: The method of any of Aspects 79-81, wherein detecting the occurrence of the trigger event comprises determining that the visited cell has a global cell ID that is the same as another cell, wherein the physical cell ID of the visited cell is different than a physical ID of the other cell.

Aspect 83: The method of any of Aspects 79-82, wherein detecting the occurrence of the trigger event comprises determining that the visited cell has a physical cell ID that is the same as another cell, wherein the global cell ID of the visited cell is different than a global ID of the other cell.

Aspect 84: The method of any of Aspects 69-83, wherein the wireless node comprises a user equipment, a distributed unit of an integrated access and backhaul (IAB) node, or a mobile termination component of an IAB node.

Aspect 85: The method of any of Aspects 69-84, wherein the visited cell is provided by a parent node of the wireless node, and wherein the parent node comprises a distributed unit of an integrated access and backhaul (IAB) node or a mobile termination component of an IAB node.

Aspect 86: A method of wireless communication performed by a wireless node, comprising: receiving, from a child node of the wireless node, a mobility history report, containing mobility history information associated with a visited cell, wherein the mobility history information comprises: a global cell identity (ID) corresponding to the visited cell, and a physical cell ID corresponding to the visited cell; and performing an action based at least in part on the mobility history information.

Aspect 87: The method of Aspect 86, wherein the visited cell comprises at least one of an integrated access and backhaul (IAB) node, a mobile node, or a combination thereof, and wherein the mobility history information comprises the global cell ID and the physical cell ID based at least in part on the visited cell comprising at least one of an IAB node, a mobile node, or a combination thereof.

Aspect 88: The method of either of Aspects 86 or 87, wherein the mobility history information comprises a set of mobility parameters, wherein the set of mobility parameters indicate at least one of: a cell identity (ID) associated with the visited cell, an entry time corresponding to a time at which the wireless node entered the visited cell, an exit time corresponding to a time at which the wireless node exited the visited cell, a duration of time for which the wireless node was visiting the visited cell, or a combination thereof.

Aspect 89: The method of any of Aspects 86-88, wherein the mobility history information comprises tracking information associated with the visited cell.

Aspect 90: The method of Aspect 89, wherein the tracking information comprises mobility state information associated with the visited cell, wherein the mobility state information at least indicates whether the visited cell was mobile while the wireless node was visiting the visited cell.

Aspect 91: The method of Aspect 90, wherein the tracking information comprises location information associated with the wireless node while the wireless node was visiting the visited cell.

Aspect 92: The method of Aspect 91, wherein the tracking information comprises the location information based at least in part on a determination that the camping threshold is satisfied, wherein the camping threshold corresponds to a duration of time that the wireless node spends visiting the visited cell.

Aspect 93: The method of either of Aspects 91 or 92, wherein the visited cell comprises at least one of an integrated access and backhaul (IAB) node, a mobile node, or a combination thereof, and wherein the tracking information comprises the location information based at least in part on the visited cell comprising at least one of an IAB node, a mobile node, or a combination thereof.

Aspect 94: The method of any of Aspects 86-93, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof.

Aspect 95: The method of any of Aspects 86-94, wherein the mobility history reporting configuration indicates event-triggered reporting of the mobility history information, and wherein the method further comprises receiving the mobility history report based at least in part on a detection of an occurrence of a trigger event.

Aspect 96: The method of Aspect 95, wherein the detection of the occurrence of the trigger event comprises a determination that the wireless node visited a quantity of cells during a time period following a prior transmission of a mobility history report, wherein the quantity of cells satisfies a threshold.

Aspect 97: The method of either of Aspects 95 or 96, wherein the detection of the occurrence of the trigger event comprises a determination that the wireless node visited the visited cell for a duration of time that satisfies a threshold.

Aspect 98: The method of any of Aspects 95-97, wherein detecting the occurrence of the trigger event comprises determining that the visited cell has a global cell ID that is the same as another cell, wherein the physical cell ID of the visited cell is different than a physical ID of the other cell.

Aspect 99: The method of any of Aspects 95-98, wherein the detection of the occurrence of the trigger event comprises a determination that the visited cell has a physical cell ID that is the same as another cell, wherein the global cell ID of the visited cell is different than a global ID of the other cell.

Aspect 100: The method of any of Aspects 86-99, wherein the wireless node comprises a user equipment, a distributed unit of an integrated access and backhaul (IAB) node, or a mobile termination component of an IAB node.

Aspect 101: The method of any of Aspects 86-100, wherein the visited cell is provided by a parent node of the wireless node, and wherein the parent node comprises a distributed unit of an integrated access and backhaul (IAB) node or a mobile termination component of an IAB node.

Aspect 102: A method of wireless communication performed by a wireless node in a wireless network, comprising: receiving a mobility history reporting configuration for providing mobility history information associated with a visited cell, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof; and transmitting, to a parent node of the wireless node, a mobility history report, containing the mobility history information, based at least in part on the mobility history reporting configuration.

Aspect 103: The method of Aspect 102, wherein the mobility history reporting configuration indicates event-triggered reporting of the mobility history information, and wherein the method further comprises: detecting an occurrence of a trigger event, wherein the wireless node transmits the mobility history report based at least in part on detecting the occurrence of the trigger event.

Aspect 104: The method of Aspect 103, wherein detecting the occurrence of the trigger event comprises determining that the wireless node visited a quantity of cells during a time period following a prior transmission of a mobility history report, wherein the quantity of cells satisfies a threshold.

Aspect 105: The method of either of Aspects 103 or 104, wherein detecting the occurrence of the trigger event comprises determining that the wireless node visited the visited cell for a duration of time that satisfies a threshold.

Aspect 106: The method of any of Aspects 103-105, wherein detecting the occurrence of the trigger event comprises determining that the visited cell has a global cell ID that is the same as another cell, wherein a physical cell ID of the visited cell is different than a physical ID of the other cell.

Aspect 107: The method of any of Aspects 103-106, wherein detecting the occurrence of the trigger event comprises determining that the visited cell has a physical cell ID that is the same as another cell, wherein a global cell ID of the visited cell is different than a global ID of the other cell.

Aspect 108: The method of any of Aspects 102-107, wherein the mobility history information comprises a set of mobility parameters, wherein the set of mobility parameters indicate at least one of: a cell identity (ID) associated with the visited cell, an entry time corresponding to a time at which the wireless node entered the visited cell, an exit time corresponding to a time at which the wireless node exited the visited cell, a duration of time for which the wireless node was visiting the visited cell, or a combination thereof.

Aspect 109: The method of any of Aspects 102-107, wherein the mobility history information comprises tracking information associated with the visited cell.

Aspect 110: The method of Aspect 109, wherein the tracking information comprises mobility state information associated with the visited cell, wherein the mobility state information at least indicates whether the visited cell was mobile while the wireless node was visiting the visited cell.

Aspect 111: The method of Aspect 110, further comprising receiving, from a parent node that provides the visited cell, the mobility state information.

Aspect 112: The method of any of Aspects 109-111, wherein the tracking information comprises location information associated with the wireless node while the wireless node was visiting the visited cell.

Aspect 113: The method of Aspect 112, further comprising: determining that a camping threshold is satisfied, wherein the camping threshold corresponds to a duration of time that the wireless node spends visiting the visited cell, wherein the tracking information comprises the location information based at least in part on determining that the camping threshold is satisfied.

Aspect 114: The method of either of Aspects 112 or 113, wherein the visited cell comprises at least one of an integrated access and backhaul (IAB) node, a mobile node, or a combination thereof, and wherein the tracking information comprises the location information based at least in part on the visited cell comprising at least one of an IAB node, a mobile node, or a combination thereof.

Aspect 115: The method of any of Aspects 102-114, wherein the mobility history information comprises: a global cell identity (ID) corresponding to the visited cell; and a physical cell ID corresponding to the visited cell.

Aspect 116: The method of Aspect 115, wherein the visited cell comprises at least one of an integrated access and backhaul (IAB) node, a mobile node, or a combination thereof, and wherein the mobility history information comprises the global cell ID and the physical cell ID based at least in part on the visited cell comprising at least one of an IAB node, a mobile node, or a combination thereof.

Aspect 117: The method of any of Aspects 102-116, wherein the wireless node comprises a user equipment, a distributed unit of an integrated access and backhaul (IAB) node, or a mobile termination component of an IAB node.

Aspect 118: The method of any of Aspects 102-117, wherein the visited cell is provided by a parent node of the wireless node, and wherein the parent node comprises a distributed unit of an integrated access and backhaul (IAB) node or a mobile termination component of an IAB node.

Aspect 119: A method of wireless communication performed by a wireless node, comprising: transmitting, to a child node of the wireless node, a mobility history reporting configuration for providing mobility history information associated with a visited cell, wherein the mobility history reporting configuration indicates at least one of: periodic reporting of the mobility history information, semi-persistent reporting of the mobility history information, event-triggered reporting of the mobility history information, dynamically requested reporting of the mobility history information, or a combination thereof; and receiving, from the child node of the wireless node, a mobility history report, containing the mobility history information, based at least in part on the mobility history reporting configuration.

Aspect 120: The method of Aspect 119, wherein the mobility history reporting configuration indicates event-triggered reporting of the mobility history information, and wherein the method further comprises receiving the mobility history report based at least in part on a detection of an occurrence of a trigger event.

Aspect 121: The method of Aspect 120, wherein the detection of the occurrence of the trigger event comprises a determination that the wireless node visited a quantity of cells during a time period following a prior transmission of a mobility history report, wherein the quantity of cells satisfies a threshold.

Aspect 122: The method of either of Aspects 120 or 121, wherein the detection of the occurrence of the trigger event comprises a determination that the wireless node visited the visited cell for a duration of time that satisfies a threshold.

Aspect 123: The method of any of Aspects 120-122, wherein the detection of the occurrence of the trigger event comprises a determination that the visited cell has a global cell ID that is the same as another cell, wherein a physical cell ID of the visited cell is different than a physical ID of the other cell.

Aspect 124: The method of any of Aspects 120-123, wherein the detection of the occurrence of the trigger event comprises a determination that the visited cell has a physical cell ID that is the same as another cell, wherein a global cell ID of the visited cell is different than a global ID of the other cell.

Aspect 125: The method of any of Aspects 119-124, wherein the mobility history information comprises a set of mobility parameters, wherein the set of mobility parameters indicate at least one of: a cell identity (ID) associated with the visited cell, an entry time corresponding to a time at which the wireless node entered the visited cell, an exit time corresponding to a time at which the wireless node exited the visited cell, a duration of time for which the wireless node was visiting the visited cell, or a combination thereof.

Aspect 126: The method of any of Aspects 119-126, wherein the mobility history information comprises tracking information associated with the visited cell.

Aspect 127: The method of Aspect 126, wherein the tracking information comprises mobility state information associated with the visited cell, wherein the mobility state information at least indicates whether the visited cell was mobile while the wireless node was visiting the visited cell.

Aspect 128: The method of either of Aspects 126 or 127, wherein the tracking information comprises location information associated with the wireless node while the wireless node was visiting the visited cell.

Aspect 129: The method of Aspect 128, wherein the tracking information comprises the location information based at least in part on a determination that the camping threshold is satisfied, wherein the camping threshold corresponds to a duration of time that the wireless node spends visiting the visited cell.

Aspect 130: The method of either of Aspects 128 or 129, wherein the visited cell comprises at least one of an integrated access and backhaul (IAB) node, a mobile node, or a combination thereof, and wherein the tracking information comprises the location information based at least in part on the visited cell comprising at least one of an IAB node, a mobile node, or a combination thereof.

Aspect 131: The method of any of Aspects 119-130, wherein the mobility history information comprises: a global cell identity (ID) corresponding to the visited cell; and a physical cell ID corresponding to the visited cell.

Aspect 132: The method of Aspect 131, wherein the visited cell comprises at least one of an integrated access and backhaul (IAB) node, a mobile node, or a combination thereof, and wherein the mobility history information comprises the global cell ID and the physical cell ID based at least in part on the visited cell comprising at least one of an IAB node, a mobile node, or a combination thereof.

Aspect 133: The method of any of Aspects 119-132, wherein the wireless node comprises a user equipment, a distributed unit of an integrated access and backhaul (IAB) node, or a mobile termination component of an IAB node.

Aspect 134: The method of any of Aspects 119-133, wherein the visited cell is provided by a parent node of the wireless node, and wherein the parent node comprises a distributed unit of an integrated access and backhaul (IAB) node or a mobile termination component of an IAB node.

Aspect 135: An apparatus for wireless communication at a device, comprising a processor; memory coupled with the processor; and instructions stored in the memory and executable by the processor to cause the apparatus to perform the method of one or more Aspects of Aspects 1-18.

Aspect 136: A device for wireless communication, comprising a memory and one or more processors coupled to the memory, the memory and the one or more processors configured to perform the method of one or more Aspects of Aspects 1-18.

Aspect 137: An apparatus for wireless communication, comprising at least one means for performing the method of one or more Aspects of Aspects 1-18.

Aspect 138: A non-transitory computer-readable medium storing code for wireless communication, the code comprising instructions executable by a processor to perform the method of one or more Aspects of Aspects 1-18.

Aspect 139: A non-transitory computer-readable medium storing a set of instructions for wireless communication, the set of instructions comprising one or more instructions that, when executed by one or more processors of a device, cause the device to perform the method of one or more Aspects of Aspects 1-18.

Aspect 140: An apparatus for wireless communication at a device, comprising a processor; memory coupled with the processor; and instructions stored in the memory and executable by the processor to cause the apparatus to perform the method of one or more Aspects of Aspects 19-35.

Aspect 141: A device for wireless communication, comprising a memory and one or more processors coupled to the memory, the memory and the one or more processors configured to perform the method of one or more Aspects of Aspects 19-35.

Aspect 142: An apparatus for wireless communication, comprising at least one means for performing the method of one or more Aspects of Aspects 19-35.

Aspect 143: A non-transitory computer-readable medium storing code for wireless communication, the code comprising instructions executable by a processor to perform the method of one or more Aspects of Aspects 19-35.

Aspect 144: A non-transitory computer-readable medium storing a set of instructions for wireless communication, the set of instructions comprising one or more instructions that, when executed by one or more processors of a device, cause the device to perform the method of one or more Aspects of Aspects 19-35.

Aspect 145: An apparatus for wireless communication at a device, comprising a processor; memory coupled with the processor; and instructions stored in the memory and executable by the processor to cause the apparatus to perform the method of one or more Aspects of Aspects 36-52.

Aspect 146: A device for wireless communication, comprising a memory and one or more processors coupled to the memory, the memory and the one or more processors configured to perform the method of one or more Aspects of Aspects 36-52.

Aspect 147: An apparatus for wireless communication, comprising at least one means for performing the method of one or more Aspects of Aspects 36-52.

Aspect 148: A non-transitory computer-readable medium storing code for wireless communication, the code comprising instructions executable by a processor to perform the method of one or more Aspects of Aspects 36-52.

Aspect 149: A non-transitory computer-readable medium storing a set of instructions for wireless communication, the set of instructions comprising one or more instructions that, when executed by one or more processors of a device, cause the device to perform the method of one or more Aspects of Aspects 36-52.

Aspect 150: An apparatus for wireless communication at a device, comprising a processor; memory coupled with the processor; and instructions stored in the memory and executable by the processor to cause the apparatus to perform the method of one or more Aspects of Aspects 53-68.

Aspect 151: A device for wireless communication, comprising a memory and one or more processors coupled to the memory, the memory and the one or more processors configured to perform the method of one or more Aspects of Aspects 53-68.

Aspect 152: An apparatus for wireless communication, comprising at least one means for performing the method of one or more Aspects of Aspects 53-68.

Aspect 153: A non-transitory computer-readable medium storing code for wireless communication, the code comprising instructions executable by a processor to perform the method of one or more Aspects of Aspects 53-68.

Aspect 154: A non-transitory computer-readable medium storing a set of instructions for wireless communication, the set of instructions comprising one or more instructions that, when executed by one or more processors of a device, cause the device to perform the method of one or more Aspects of Aspects 53-68.

Aspect 155: An apparatus for wireless communication at a device, comprising a processor; memory coupled with the processor; and instructions stored in the memory and executable by the processor to cause the apparatus to perform the method of one or more Aspects of Aspects 69-85.

Aspect 156: A device for wireless communication, comprising a memory and one or more processors coupled to the memory, the memory and the one or more processors configured to perform the method of one or more Aspects of Aspects 69-85.

Aspect 157: An apparatus for wireless communication, comprising at least one means for performing the method of one or more Aspects of Aspects 69-85.

Aspect 158: A non-transitory computer-readable medium storing code for wireless communication, the code comprising instructions executable by a processor to perform the method of one or more Aspects of Aspects 69-85.

Aspect 159: A non-transitory computer-readable medium storing a set of instructions for wireless communication, the set of instructions comprising one or more instructions that, when executed by one or more processors of a device, cause the device to perform the method of one or more Aspects of Aspects 69-85.

Aspect 160: An apparatus for wireless communication at a device, comprising a processor; memory coupled with the processor; and instructions stored in the memory and executable by the processor to cause the apparatus to perform the method of one or more Aspects of Aspects 86-101.

Aspect 161: A device for wireless communication, comprising a memory and one or more processors coupled to the memory, the memory and the one or more processors configured to perform the method of one or more Aspects of Aspects 86-101.

Aspect 162: An apparatus for wireless communication, comprising at least one means for performing the method of one or more Aspects of Aspects 86-101.

Aspect 163: A non-transitory computer-readable medium storing code for wireless communication, the code comprising instructions executable by a processor to perform the method of one or more Aspects of Aspects 86-101.

Aspect 164: A non-transitory computer-readable medium storing a set of instructions for wireless communication, the set of instructions comprising one or more instructions that, when executed by one or more processors of a device, cause the device to perform the method of one or more Aspects of Aspects 86-101.

Aspect 165: An apparatus for wireless communication at a device, comprising a processor; memory coupled with the processor; and instructions stored in the memory and executable by the processor to cause the apparatus to perform the method of one or more Aspects of Aspects 102-118.

Aspect 166: A device for wireless communication, comprising a memory and one or more processors coupled to the memory, the memory and the one or more processors configured to perform the method of one or more Aspects of Aspects 102-118.

Aspect 167: An apparatus for wireless communication, comprising at least one means for performing the method of one or more Aspects of Aspects 102-118.

Aspect 168: A non-transitory computer-readable medium storing code for wireless communication, the code comprising instructions executable by a processor to perform the method of one or more Aspects of Aspects 102-118.

Aspect 169: A non-transitory computer-readable medium storing a set of instructions for wireless communication, the set of instructions comprising one or more instructions that, when executed by one or more processors of a device, cause the device to perform the method of one or more Aspects of Aspects 102-118.

Aspect 170: An apparatus for wireless communication at a device, comprising a processor; memory coupled with the processor; and instructions stored in the memory and executable by the processor to cause the apparatus to perform the method of one or more Aspects of Aspects 119-134.

Aspect 171: A device for wireless communication, comprising a memory and one or more processors coupled to the memory, the memory and the one or more processors configured to perform the method of one or more Aspects of Aspects 119-134.

Aspect 172: An apparatus for wireless communication, comprising at least one means for performing the method of one or more Aspects of Aspects 119-134.

Aspect 173: A non-transitory computer-readable medium storing code for wireless communication, the code comprising instructions executable by a processor to perform the method of one or more Aspects of Aspects 119-134.

Aspect 174: A non-transitory computer-readable medium storing a set of instructions for wireless communication, the set of instructions comprising one or more instructions that, when executed by one or more processors of a device, cause the device to perform the method of one or more Aspects of Aspects 119-134.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless node for wireless communication, comprising:
   a memory; and
   one or more processors, coupled to the memory, configured to cause the wireless node to:
      receive a mobility history reporting configuration for providing mobility history information associated with a visited cell; and
      transmit, to a parent node of the wireless node, a mobility history report containing the mobility history information, based at least in part on the mobility history reporting configuration,
      wherein the mobility history information comprises tracking information that includes mobility state information associated with the visited cell,
      wherein the mobility state information indicates whether the visited cell was mobile while the wireless node was visiting the visited cell.

2. The wireless node of claim 1, wherein the one or more processors are further configured to cause the wireless node to:
   receive, from a second parent node that provides the visited cell, the mobility state information.

3. The wireless node of claim 1, wherein the tracking information comprises location information associated with the wireless node while the wireless node was visiting the visited cell.

4. The wireless node of claim 3, wherein the one or more processors are further configured to cause the wireless node to:
   determine that a camping threshold is satisfied, wherein the camping threshold corresponds to a duration of time that the wireless node spends visiting the visited cell, and wherein the tracking information comprises the location information based at least in part on the determining that the camping threshold is satisfied.

5. The wireless node of claim 3, wherein the visited cell comprises at least one of an integrated access and backhaul (IAB) node, a mobile node, or a combination thereof, and wherein the tracking information comprises the location information based at least in part on the visited cell comprising at least one of the IAB node, the mobile node, or a combination thereof.

6. The wireless node of claim 1, wherein the mobility history information comprises a set of mobility parameters, wherein the set of mobility parameters indicate at least one of:
   a cell identity (ID) associated with the visited cell;
   an entry time corresponding to a time at which the wireless node entered the visited cell;
   an exit time corresponding to a time at which the wireless node exited the visited cell;
   a duration of time for which the wireless node was visiting the visited cell; or
   a combination thereof.

7. The wireless node of claim 1, wherein the mobility history reporting configuration indicates event-triggered reporting of the mobility history information, and wherein the one or more processors are further configured to cause the wireless node to:

detect an occurrence of a trigger event, the wireless node being configured to transmit the mobility history report based at least in part on the detecting the occurrence of the trigger event.

8. The wireless node of claim 7, wherein the one or more processors, to detect the occurrence of the trigger event, are configured to cause the wireless node to:
determine that the wireless node visited a quantity of cells during a time period following a prior transmission of a prior mobility history report, wherein the quantity of cells satisfies a threshold.

9. The wireless node of claim 7, wherein the one or more processors, to detect the occurrence of the trigger event, are configured to cause the wireless node to:
determine that the wireless node visited the visited cell for a duration of time that satisfies a threshold.

10. The wireless node of claim 7, wherein the one or more processors, to detect the occurrence of the trigger event, are configured to cause the wireless node to:
determine that the visited cell has a global cell ID that is the same as another cell, wherein a physical cell ID of the visited cell is different than a physical ID of the other cell.

11. The wireless node of claim 7, wherein the one or more processors, to detect the occurrence of the trigger event, are configured to cause the wireless node to:
determine that the visited cell has a physical cell ID that is the same as another cell, wherein a global cell ID of the visited cell is different than a global ID of the other cell.

12. The wireless node of claim 1, wherein the mobility history information comprises a global cell identity (ID) corresponding to the visited cell and a physical cell ID corresponding to the visited cell.

13. The wireless node of claim 12, wherein the visited cell comprises at least one of an integrated access and backhaul (IAB) node, a mobile node, or a combination thereof, and wherein the mobility history information comprises the global cell ID and the physical cell ID based at least in part on the visited cell comprising at least one of the IAB node, the mobile node, or a combination thereof.

14. The wireless node of claim 1, wherein the mobility history reporting configuration indicates at least one of:
periodic reporting of the mobility history information;
semi-persistent reporting of the mobility history information;
event-triggered reporting of the mobility history information;
dynamically requested reporting of the mobility history information; or
a combination thereof.

15. A wireless node for wireless communication, comprising:
a memory; and
one or more processors, coupled to the memory, configured to cause the wireless node to:
receive, from a child node of the wireless node, a mobility history report containing mobility history information associated with a visited cell,
wherein the mobility history information comprises tracking information that includes mobility state information associated with the visited cell; and
perform an action based at least in part on the mobility history information,
wherein the mobility state information indicates whether the visited cell was mobile while the child node was visiting the visited cell.

16. The wireless node of claim 15, wherein the tracking information comprises location information associated with the child node while the child node was visiting the visited cell.

17. The wireless node of claim 16, wherein the visited cell comprises at least one of an integrated access and backhaul (IAB) node, a mobile node, or a combination thereof, and wherein the tracking information comprises the location information based at least in part on the visited cell comprising at least one of the IAB node, the mobile node, or a combination thereof.

18. The wireless node of claim 15, wherein the mobility history information comprises a set of mobility parameters, wherein the set of mobility parameters indicate at least one of:
a cell identity (ID) associated with the visited cell;
an entry time corresponding to a time at which the child node entered the visited cell;
an exit time corresponding to a time at which the child node exited the visited cell;
a duration of time for which the child node was visiting the visited cell; or
a combination thereof.

19. The wireless node of claim 15, wherein the mobility history information comprises a global cell identity (ID) corresponding to the visited cell and a physical cell ID corresponding to the visited cell.

20. The wireless node of claim 19, wherein the visited cell comprises at least one of an integrated access and backhaul (IAB) node, a mobile node, or a combination thereof, and wherein the mobility history information comprises the global cell ID and the physical cell ID based at least in part on the visited cell comprising at least one of the IAB node, the mobile node, or a combination thereof.

21. The wireless node of claim 15, wherein the one or more processors are configured to cause the wireless node to:
transmit, to the child node, a mobility history reporting configuration for providing mobility history information associated with the visited cell, wherein the mobility history reporting configuration indicates at least one of:
periodic reporting of the mobility history information;
semi-persistent reporting of the mobility history information;
event-triggered reporting of the mobility history information;
dynamically requested reporting of the mobility history information; or
a combination thereof.

22. A method for wireless communication by a wireless node, comprising:
receiving a mobility history reporting configuration for providing mobility history information associated with a visited cell; and
transmitting, to a parent node of the wireless node, a mobility history report containing the mobility history information, based at least in part on the mobility history reporting configuration,
wherein the mobility history information comprises tracking information that includes mobility state information associated with the visited cell,
wherein the mobility state information indicates whether the visited cell was mobile while the wireless node was visiting the visited cell.

23. The method of claim 22, wherein the method comprises:

receiving, from a second parent node that provides the visited cell, the mobility state information.

24. The method of claim 22, wherein the tracking information comprises location information associated with the wireless node while the wireless node was visiting the visited cell.

25. The method of claim 22 wherein the mobility history information comprises a set of mobility parameters, wherein the set of mobility parameters indicate at least one of:
   a cell identity (ID) associated with the visited cell;
   an entry time corresponding to a time at which the wireless node entered the visited cell;
   an exit time corresponding to a time at which the wireless node exited the visited cell;
   a duration of time for which the wireless node was visiting the visited cell; or
   a combination thereof.

26. The method of claim 22, wherein the mobility history reporting configuration indicates event-triggered reporting of the mobility history information, and wherein the method comprises:
   detecting an occurrence of a trigger event, the wireless node being configured to transmit the mobility history report based at least in part on the detecting the occurrence of the trigger event.

27. The method of claim 26, wherein detecting the occurrence of the trigger event comprises:
   determine that the wireless node visited a quantity of cells during a time period following a prior transmission of a prior mobility history report, wherein the quantity of cells satisfies a first threshold, or
   determine that the wireless node visited the visited cell for a duration of time that satisfies a second threshold, or
   determine that the visited cell has a first global cell ID that is the same as a first global ID of another cell, wherein a first physical cell ID of the visited cell is different than a first physical ID of the other cell, or
   determine that the visited cell has a second physical cell ID that is the same as a second physical cell ID of another cell, wherein a second global cell ID of the visited cell is different than a second global ID of the other cell.

28. The method of claim 22, wherein the mobility history information comprises a global cell identity (ID) corresponding to the visited cell and a physical cell ID corresponding to the visited cell.

29. The method of claim 22, wherein the mobility history reporting configuration indicates at least one of:
   periodic reporting of the mobility history information;
   semi-persistent reporting of the mobility history information;
   event-triggered reporting of the mobility history information;
   dynamically requested reporting of the mobility history information; or
   a combination thereof.

30. A method for wireless communication by a wireless node, comprising:
   receiving, from a child node of the wireless node, a mobility history report containing mobility history information associated with a visited cell,
   wherein the mobility history information comprises tracking information that includes mobility state information associated with the visited cell; and
   performing an action based at least in part on the mobility history information,
   wherein the mobility state information indicates whether the visited cell was mobile while the child node was visiting the visited cell.

* * * * *